United States Patent [19]

Schultz

[11] Patent Number: 5,479,090
[45] Date of Patent: Dec. 26, 1995

[54] POWER CONVERTER HAVING OPTIMAL DYNAMIC OPERATION

[75] Inventor: Charles P. Schultz, Lincoln, Mass.

[73] Assignee: Raytheon Company, Lexington, Mass.

[21] Appl. No.: 158,108

[22] Filed: Nov. 24, 1993

[51] Int. Cl.$^6$ ................................................. G05F 1/56
[52] U.S. Cl. ........................ 323/284; 323/285; 323/288; 323/351
[58] Field of Search ................................ 323/282, 284, 323/285, 288, 351

[56] References Cited

U.S. PATENT DOCUMENTS

| | | | |
|---|---|---|---|
| 3,781,653 | 12/1973 | Marini | 323/17 |
| 3,913,002 | 10/1975 | Steigerwald et al. | 321/2 |
| 4,146,832 | 3/1979 | McConnell | 323/17 |
| 4,278,930 | 7/1981 | Rogers | 323/285 |
| 4,631,470 | 12/1986 | Bingley | 323/282 |
| 4,862,057 | 8/1989 | Contartese et al. | 323/285 |
| 5,013,998 | 5/1991 | Varga et al. | 323/285 |
| 5,122,728 | 6/1992 | Ashley | 323/282 |
| 5,192,906 | 3/1993 | Nathan | 323/284 |
| 5,253,155 | 10/1993 | Yamamoto | 363/71 |
| 5,302,889 | 4/1994 | Marsh | 323/284 |

OTHER PUBLICATIONS

"Synthesis of Zero-Admittance Converter," N. A. Losic, L. D. Varga and Z. D. Popovic, Power Conversion, October 1993 Proceedings, pp. 330–339.
"A New Integrated Circuit for Current-Mode Control," Application Note, Unitrode Corporation, Lexington, Mass., U-93, pp. 210–218.
"Modelling and Analysis of Switching DC-to-DC Converters in Constant-Frequency Current-Programmed Mode," Shi-Ping Hsu, A. Brown, L. Rensink and R. D. Middlebrook, IEEE 1979, pp. 284–301.
"Current Mode control for High Frequency Switchmode," B. Carston, Oltronics Canada Ltd., PCIM Apr. 1986, pp. 61–65.
"State Space Analysis of Buck Regulated DC–DC Converters for Inductive Focusing Coils," C. P. Schultz, Power Conversion, Oct. 1989 Proceedings, pp. 502–516.

Primary Examiner—Peter S. Wong
Assistant Examiner—Shawn Riley
Attorney, Agent, or Firm—Donald F. Mofford

[57] ABSTRACT

A DC to DC, fixed frequency, Buck family power converter having a first feedback control loop for regulating output current or output voltage depending on the operational mode selected, a second feedback control loop for current mode control and a third feedback control loop for providing improved dynamic response for all conditions of line and load. The third feedback control loop senses the output voltage and generates a variable ramp signal having a slope (M) which is proportional to the converter output voltage. By maintaining as a constant (K) a ratio of the variable ramp slope (M) to the falling slope ($M_2$) of a voltage representation of the inductor current in an LC network of the Buck regulator or $K=M/M_2$, improved dynamic operation of the power converter results for a plurality of output voltages particularly improving output ripple rejection and minimizing effects of injected noise in the current mode control loop.

53 Claims, 9 Drawing Sheets

POWER CONVERTER HAVING OPTIMAL DYNAMIC OPERATION

BACKGROUND OF THE INVENTION

This invention relates generally to pulse width modulated DC to DC power converters and in particular to a DC to DC power converter having an additional control loop for optimized dynamic control of such a converter when operating in a constant load current regulation mode or an output voltage regulation mode.

Pulse width modulator power converters have many types of control techniques, among the most popular forms being conventional voltage mode control, and current mode control. With voltage mode control, a control voltage is compared to a constant ramp to determine the appropriate duty cycle. Current mode control sums a sample of a filter inductor's current waveform with an external fixed-slope ramp signal.

Current mode control of switching regulators is well known in the art where an inner or secondary loop is used to directly control peak inductor current with an error signal rather than directly controlling the duty ratio of a pulse width modulator as in conventional voltage mode switching regulator converters. Hence, instead of comparing the error voltage to a voltage ramp, it is compared to an analogue of the inductor current forcing the peak current to follow the error voltage. (See Application Handbook 1985–86 Note by Unitrode Corporation of Lexington, Mass. "A New Integrated Circuit For Current-Mode Control," pp 210–218, 1983).

In a power supply for a traveling wave tube focusing coil of a radar system, a need arises to provide a constant current to the focusing coil. However, due to variations in focusing coil parameters because of different manufacturers, due to different operating current levels for coils from the same manufacturer, and also due to thermal heating of the focusing coil, it is necessary to support various output voltages $V_o$ of a DC to DC converter in order to maintain a constant current output through various loads. The DC to DC converter dynamic operation is optimal for only one value of the output voltage.

A Buck regulator DC—DC converter for driving traveling wave tube focusing coils is described in a paper entitled "State Space Analyses of Buck Regulated DC—DC Converters for Inductive Focusing Coils," by C. P. Schultz, Proceedings of Power Conversion, Oct. 19, 1989, pp. 502–510. A current mode control type of converter circuit is described having an inner current feedback loop inside the primary regulation loop. A stabilizing voltage ramp may be injected into the regulation loop to maintain stability of the circuit for duty ratios greater than 0.5. When such a circuit is adapted to have the primary regulation loop sense output load current in order to maintain a constant output load current, the circuit has optimum dynamic performance for one voltage output; an example of optimum dynamic performance is minimized variations in output voltage due to variations of the input voltage. A circuit ratio (K) of primary interest is the slope of the injected voltage ramp referred to as (M) relative to the "falling slope of the inductor current" (referred to as $M_2$) after being sensed by a current sensor. $M_2$ for a Buck regulator topology equals $V_o/L$. Hence, as the output voltage changes and the ramp slope remains fixed, this ratio varies resulting in non-optimal dynamic response for such a converter circuit. It can be seen from this ratio that if a ramp slope is generated that is proportional to $V_o$, then this ratio would be a constant resulting in an optimally controlled converter especially for improving ripple rejection or minimizing the effects of noise injected into the inner current feedback loop.

SUMMARY OF THE INVENTION

Accordingly, it is therefore an object of this invention to provide a regulated DC to DC power converter having optimal dynamic operation for each of a plurality of output voltages.

It is a further object of this invention to provide a power converter having a constant well defined ratio (K) during steady state operation over the plurality of output voltages, the ratio (K) being the slope of a control ramp relative to a voltage representation of the downslope of an inductor current.

It is a further object of this invention to provide a power converter that maintains a constant load current or a constant output voltage in accordance with a predetermined selected mode of operation.

It is a further object of this invention to provide a power converter having an improved dynamic response to produce improved ripple rejection or to minimize effects of noise ejected into an inner current mode control feedback loop.

The objects are further accomplished by providing a power converter comprising an input DC voltage ($V_I$), switching means having ON and OFF states coupled to the voltage for passing the voltage in accordance with a control signal fed to the switching means, means coupled to the switching means for sensing a current passing through the switching means when the switching means is in the ON state, energy storage means coupled to the current sensing means for maintaining a continuous output load current from the power converter when the switching means is in the OFF state, means for generating the control signal for the switching means in accordance with a clock signal having a predetermined frequency, a first feedback control signal, a second feedback control signal and a third feedback control signal, means for sensing an output voltage of the power converter or the output load current to provide regulation of the sensed output voltage or output load current, means coupled to the output sensing means and a predetermined output reference signal for generating the first feedback control signal, the second feedback control signal being generated by the means for sensing the current passing through the switching means, means coupled to the output voltage of the power converter at the output of the energy storage means for continuous sampling of the output voltage, and means coupled to the output voltage sampling means for generating the third feedback control signal. The control signal generating means comprises, means for summing the first feedback control signal and the third feedback control signal, comparator means coupled to an output signal of the summing means and an output signal of the switch current sensing means for generating a reset signal when the output signals are equal in value, and means coupled to the reset signal and a predetermined frequency clock signal for generating the switch control signal. The energy storage means comprises a diode coupled to a junction of the sensing means and the energy storage means for providing a path for the output load current when the switching means is in the OFF state. The first feedback control signal generating means comprises an error amplifier for detecting variations of the sensed output relative to the predetermined output reference signal. The second feedback control signal provides a voltage representation of the current passing through the switching means for comparison with the output of the summing means. The third feedback control signal generating means comprises a ramp generator for providing a variable ramp signal having a slope which is proportional to the power converter output voltage, the ramp signal being reset to an initial value by the clock signal. The energy storage means comprises an inductor-capacitor filter wherein a current through the inductor has a rising slope and a falling slope, the falling slope being proportional to the power converter output voltage, and a ratio of the slope of the ramp signal to the falling slope of the inductor current being a constant produces improved dynamic operation of the power converter including improved ripple rejection at the power converter output and minimization of effects of noise injected in the second feedback control or current mode control loop.

The objects are further accomplished by providing a power converter comprising an input DC voltage ($V_I$), switching means having ON and OFF states coupled to the DC voltage for passing the voltage in accordance with a control signal fed to the switching means, means coupled to the switching means for sensing a current passing through the switching means when the switching means is in the ON state, energy storage means coupled to the current sensing means for maintaining a continuous output load current from the power converter when the switching means is in the OFF state, means for generating the control signal for the switching means in accordance with a clock signal having a predetermined frequency, a first feedback control signal, a second feedback control signal and a third feedback control signal, means for selecting a predetermined mode of operation for the power converter, a first mode of operation regulating an output load current and a second mode of operation regulating an output voltage, the selecting means having a first feedback input representative of the output load current and a second feedback input representative of the output voltage, means coupled to an output load for sensing the continuous output load current, the sensing means providing the first feedback input to the selecting means, means coupled to the selecting means and a predetermined reference signal for generating the first feedback control signal, the second feedback control signal being generated by the means for sensing the current passing through the switching means, means for continuous sampling of the output voltage of the power converter, the continuous sampling means providing the second feedback input to the selecting means, and means coupled to the output voltage sampling means for generating the third feedback control signal. The control signal generating means comprises means for summing the first feedback control signal and the third feedback control signal, comparator means coupled to an output signal of the summing means and an output signal of the switch current sensing means for generating a reset signal when the output signals are equal in value, and means coupled to the reset signal and a predetermined frequency clock signal for generating the switch control signal. The energy storage means comprises a diode coupled to a junction of the sensing means and the energy storage means for providing a path for the output load current when the switching means is in the OFF state. The first feedback control signal generating means comprises an error amplifier for detecting variations of the regulated output of the selected mode of operation relative to the predetermined reference signal. The second feedback control signal provides a voltage representation of the current passing through the switching means for comparison with the output of the summing means. The third feedback control signal generating means comprises a ramp generator for providing a variable ramp signal having a slope which is proportional to the power converter output voltage, the ramp signal being reset to an initial value by the clock signal. The energy storage means comprises an inductor-capacitor filter wherein a current through the inductor has a rising slope and a falling slope, the falling slope being proportional to the power converter output voltage, and a ratio of the slope of the ramp signal to the falling slope of the inductor current being a constant produces improved dynamic operation of the power converter.

The objects are further accomplished by providing a power converter for regulating output load current comprising an input DC voltage ($V_I$), switching means having ON and OFF states coupled to the DC voltage for passing the voltage in accordance with a control signal fed to the switching means, means coupled to the switching means for sensing a current passing through the switching means when the switching means is in the ON state, energy storage means coupled to the current sensing means for maintaining a continuous output load current from the power converter when the switching means is in the OFF state, means for generating the control signal for the switching means in accordance with a clock signal having a predetermined frequency, a first feedback control signal, a second feedback control signal and a third feedback control signal, means coupled to an output load of the power converter for sensing the output load current, means coupled to the output load current sensing means and a predetermined output current reference signal for generating the first feedback control signal to maintain a constant output load current, the second feedback control signal being generated by the means for sensing the current passing through the switching means, means coupled to an output voltage of the power converter at the output of the energy storage means for continuous sampling the output voltage, and means coupled to the output voltage sampling means for generating the third feedback control signal. The control signal generating means comprises means for summing the first feedback control signal and the third feedback control signal, comparator means coupled to an output signal of the summing means and an output signal of the switch current sensing means for generating a reset signal when the output signals are equal in value, and means coupled to the reset signal and a predetermined frequency clock signal for generating the switch control signal. The energy storage means comprises a diode coupled to a junction of the sensing means and the energy storage means for providing a path for the output load current when the switching means is in the OFF state. The first feedback control signal generating means comprises an error amplifier for detecting variations of the sensed output relative to the predetermined output reference signal. The second feedback control signal provides a voltage representation of the current passing through the switching means for comparison with the output of the summing means. The third feedback control signal generating means comprises a ramp generator for providing a variable ramp signal having a slope which is proportional to the power converter output voltage, the ramp signal being reset to an initial value by the clock signal. The energy storage means comprises an inductor-capacitor filter wherein a current through the inductor has a rising slope and a falling slope, the falling slope being proportional to the power converter output voltage, and a ratio of the slope of the ramp signal to the falling slope of the inductor current being a constant produces improved dynamic operation of the power converter.

The objects are further accomplished by providing a power converter for regulating output voltage comprising an input DC voltage ($V_I$), switching means having ON and OFF states coupled to the DC voltage for passing the voltage in accordance with a control signal fed to the switching means, means coupled to the switching means for sensing a current passing through the switching means when the switching means in the is ON state, energy storage means coupled to the current sensing means for maintaining a continuous output load current from the power converter when the switching means is in the OFF state, means for generating the control signal for the switching means in accordance with a clock signal having a predetermined frequency, a first feedback control signal, a second feedback control signal and a third feedback control signal, means coupled to the output voltage of the power converter at the output of the energy storage means for continuous sampling of a portion of the output voltage, means coupled to the output voltage sampling means and a predetermined output voltage reference signal for generating the first feedback control signal to maintain a constant output voltage, the second feedback control signal being generated by the means for sensing the current passing through the switching means, and means coupled to the output voltage sampling means for generating the third feedback control signal. The control signal generating means comprises means for summing the first feedback control signal and the third feedback control signal, comparator means coupled to an output signal of the summing means and an output signal of the switch current sensing means for generating a reset signal when the output signals are equal in value, and means coupled to the reset signal and a predetermined frequency clock signal for generating the switch control signal. The first feedback control signal generating means comprises an error amplifier for detecting variations of the output voltage relative to the predetermined output voltage reference signal. The second feedback control signal provides a voltage representation of the current passing through the switching means for comparison with the output of the summing means. The third feedback control signal generating means comprises a ramp generator for providing a variable ramp signal having a slope which is proportional to the power converter output voltage, the ramp signal being reset to an initial value by the clock signal. The energy storage means comprises an inductor-capacitor filter wherein a current through the inductor has a rising slope and a falling slope, the falling slope being proportional to the power converter output voltage, and a ratio of the slope of the ramp signal to the falling slope of the inductor current being a constant produces improved dynamic operation of the power converter.

The objects are further accomplished by a method for providing a power converter having improved dynamic response comprising the steps of providing an input DC voltage ($V_I$), passing the input DC voltage through a switching means having ON and OFF states in accordance with a control signal fed to the switching means, sensing a current passing through the switching means when the switching means is in the ON state, maintaining a continuous output load current from the power converter when the switching means is in the OFF state with energy storage means coupled to the current sensing means, generating the control signal for the switching means in accordance with a clock signal having a predetermined frequency, a first feedback control signal, a second feedback control signal and a third feedback control signal, sensing an output voltage of the power converter or the output load current to provide regulation of the sensed output voltage or output load current, generating the first feedback control signal with means coupled to the output sensing means and a predetermined output reference signal, generating the second feedback control signal by the means for sensing the current passing through the switching means, sampling continuously the output voltage of the power converter with means coupled to the output voltage at the output of the energy storage means, and generating the third feedback control signal with means coupled to the output voltage sampling means. The step of maintaining an output load current comprises the step of providing a path for the output load current when the switching means is in the OFF state with a diode coupled to a junction of the sensing means and the energy storage means. The step of generating the control signal comprises the steps of summing the first feedback control signal and the third feedback control signal, comparing an output signal of the summing means and an output signal of the switch current sensing means to generate a reset signal when the output signals are equal in value, and generating the switch control signal with means coupled to the reset signal and a predetermined frequency clock signal. The step of generating the first feedback control signal comprises the step of, detecting variations of the sensed output relative to the predetermined output reference signal with an error amplifier. The step of generating the second feedback control signal comprises the step of providing a voltage representation of the current passing through the switching means for comparison with the output of a summing means. The step of generating the third feedback control signal comprises the step of, providing a variable ramp signal having a slope which is proportional to the power converter output voltage, the ramp signal being reset to an initial value by the clock signal. The step of maintaining a continuous output load current further comprises the steps of providing an inductor-capacitor filter in the energy storage means with a current passing through the inductor having a rising slope and a falling slope, the falling slope being proportional to the power converter output voltage, and maintaining as a constant ratio the slope of the ramp signal to the falling slope of the inductor current.

The objects are further accomplished by a method for providing a power converter having improved dynamic response comprising the steps of providing an input DC voltage ($V_I$), passing the input DC voltage through a switching means having ON and OFF states in accordance with a control signal fed to the switching means, sensing a current passing through the switching means when the switching means is in the ON state with means coupled to the switching means, maintaining a continuous output load current from the power converter when the switching means is in the OFF state with energy storage means coupled to the current sensing means, generating the control signal for the switching means in accordance with a clock signal having a predetermined frequency, a first feedback control signal, a second feedback control signal and a third feedback control signal, selecting a predetermined mode of operation for the power converter with means coupled to a first feedback input representative of an output load current and a second feedback input representative of an output voltage of the power converter, a first mode of operation regulating the output load current and a second mode of operation regulating the output voltage, sensing the continuous output load current for providing the first feedback input to the mode selecting means, generating the first feedback control signal with means coupled to the selecting means and a predetermined reference signal, generating the second feedback control signal by the means for sensing the current passing through the switching means, sampling continuously the output voltage of the power converter for providing the second feedback input to the mode selecting means, and generating the third feedback control signal with means coupled to an output of the output voltage sampling means. The step of generating the control signal comprises the steps of summing the first feedback control signal and the third feedback control signal, comparing an output signal of the summing means and an output signal of the switch current sensing means to generate a reset signal when the output signals are equal in value, and generating the switch control signal with means coupled to the reset signal and a predetermined frequency clock signal. The step of generating the first feedback control signal comprises the step of detecting variations of the regulated output of the selected mode of operation relative to the predetermined reference signal with an error amplifier. The step of generating the second feedback control signal comprises the step of providing a voltage representation of the current passing through the switching means for comparison with the output of a summing means. The step of generating the third feedback control signal comprises the step of providing a variable ramp signal having a slope which is proportional to the power converter output voltage, the ramp signal being reset to an initial value by the clock signal. The step of maintaining a continuous output load current further comprises the steps of providing an inductor-capacitor filter in the energy storage means with a current passing through the inductor having a rising slope and a falling slope, the falling slope being proportional to the power converter output voltage, and maintaining as a constant ratio the slope of the ramp signal to the falling slope of the inductor current.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
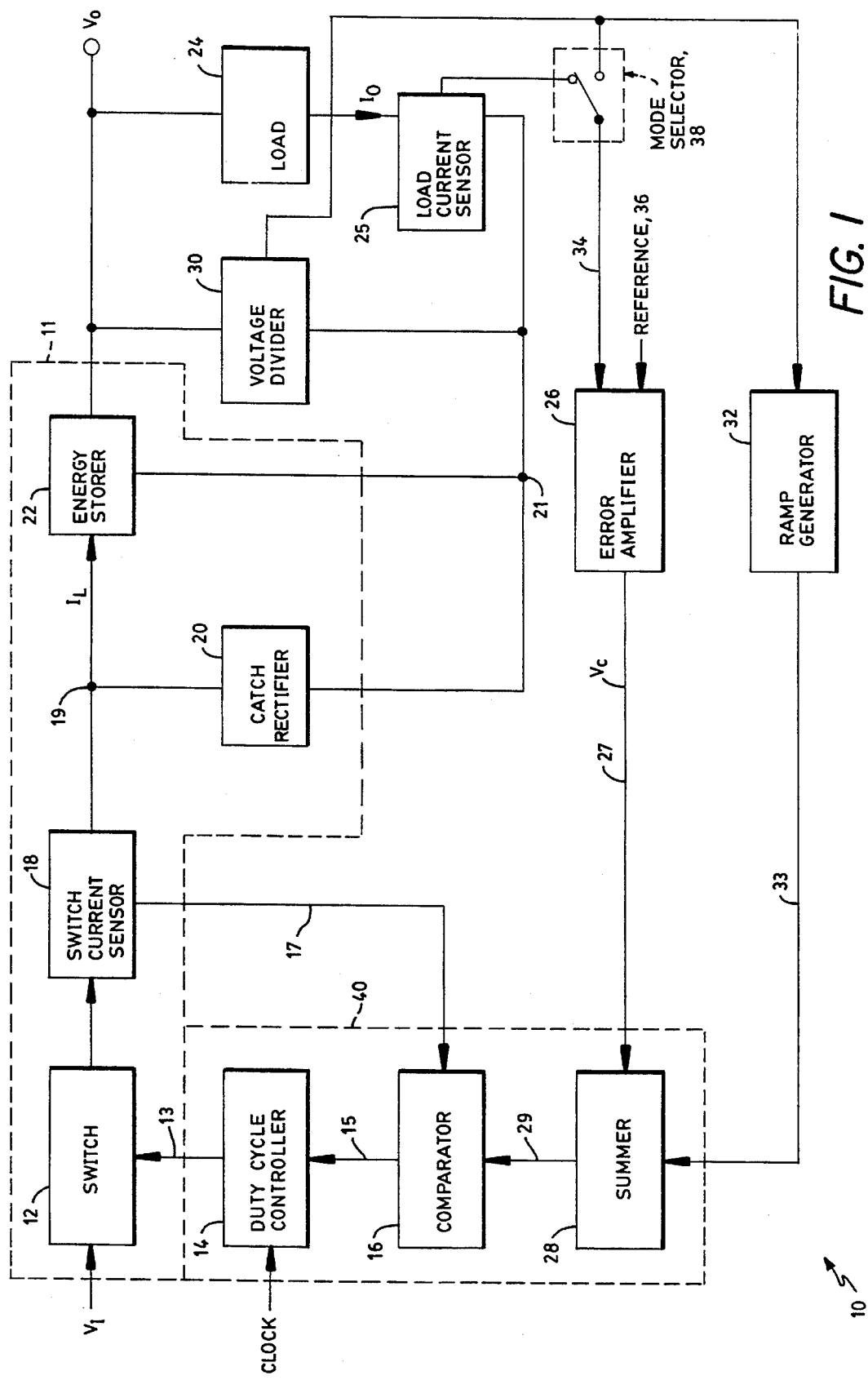
FIG. 1 is a block diagram of a power converter having a third feedback loop for optimizing dynamic operations according to the invention.

Referring to FIG. 1, a block diagram of a DC to DC power converter 10 is shown embodying the principles of the invention to provide improved dynamic operations. The power converter 10 comprises two modes of operation in accordance with a mode selector 38. When an error amplifier 26 is connected to a load current sensor 25, the power converter 10 provides regulation of an output load current. When the error amplifier 26 is connected to the output of a voltage divider 30, the power converter provides regulation of an output voltage.

The power converter 10 employs a first feedback control loop for regulating load current or output voltage, a well known current mode control second feedback control loop, and an additional third feedback control loop for providing optimal control for the improved dynamic response over all operating conditions of line and load. A DC input voltage ($V_I$) is fed to a transistor switch 12 which is turned-on and off by a pulse width modulated (PWM) control signal 13. When the switch 12 is turned-on, the input voltage is applied to an energy storer 22, which comprises an inductor-capacitor (LC) network, through a switch current sensor 18 which is connected between the switch 12 and the energy storer 22. A rectifier 20 referred to as a "catch rectifier" is connected between the input of the energy storer 22 and power return 21. The catch rectifier 20 provides a path for output current to flow when the transistor switch 12 is turned-off. The output voltage ($V_o$) of the power converter 10 is provided at the output of the energy storer 22. The power converter 10 employs a Buck converter topology 11 with the addition of the switch current sensor 18 for supplying a feedback current signal 17.

Regulation of the power converter 10 is accomplished with three feedback signals comprising an error signal 27 in the first feedback control loop, a current signal 17 in the second feedback control loop and a ramp signal 33 in the third feedback control loop. A voltage divider 30 is connected between the output voltage $V_o$ and power return 21 for providing a voltage signal representative of the output voltage to a ramp generator 32 which generates the feedback ramp signal 33. A load 24 is connected to the $V_o$ output of the power converter 10. The operation of power converter 10 in the current regulation mode is particularly optimal for the characteristics of a solenoid load, which is representative of a focusing coil in a traveling wave tube. A load current sensor 25 is connected between the solenoid load 24 and power return 21 for sensing the load current $I_o$ and generating a load current sample signal 34 which is fed to an error amplifier 26 via a mode selector 38 switch. The error amplifier 26 also receives a reference signal 36. The mode selector 38 switch selects a regulated output load current mode of operation or a regulated output voltage ($V_o$) mode of operation for the power converter 10. The mode selector 38 may be replaced with a direct connection when the power converter 10 is used only to regulate output load current or only to regulate output voltage. The error amplifier 26 generates a feedback control error signal 27. The switch current sensor 18 generates the second current feedback control signal 17.

The PWM control signal 13, which determines the amount of time that the switch 12 is ON and OFF, is generated by a duty-cycle controller 14. The duty cycle controller 14 receives as inputs a clock signal having a predetermined fixed frequency and a reset signal 15. The reset signal 15 is generated by a comparator 16 which compares the feedback current signal 17 to a variable ramp signal 29 generated by a summer 28. When the values of these two input signals are equal, the reset signal 15 is generated by the comparator 16. The duty cycle controller turns-off the switch 12 when so commanded by the reset signal 15 and latches it, Subsequent turn-on occurs at the next clock cycle. The feedback error signal 27 and the feedback ramp signal 33 are summed in summer 28 which generates the variable ramp signal 29. The error signal 27 from the error amplifier 26 comprises a slowly varying voltage when observed over only a few clock cycles and the feedback ramp signal 33 from the ramp generator 32 is a negative slope variable ramp which varies in accordance with the variances in the sampled output voltage $V_o$. The power converter 10, when operating in the regulated output load current mode, provides a constant current ($I_o$) to the solenoid load 24, and the output voltage $V_o$ for each different solenoid load is allowed to change in accordance with the characteristics of the load, but regulation at each resulting output voltage is optimally maintained by the third feedback loop comprising ramp generator 32.

Figure 2:
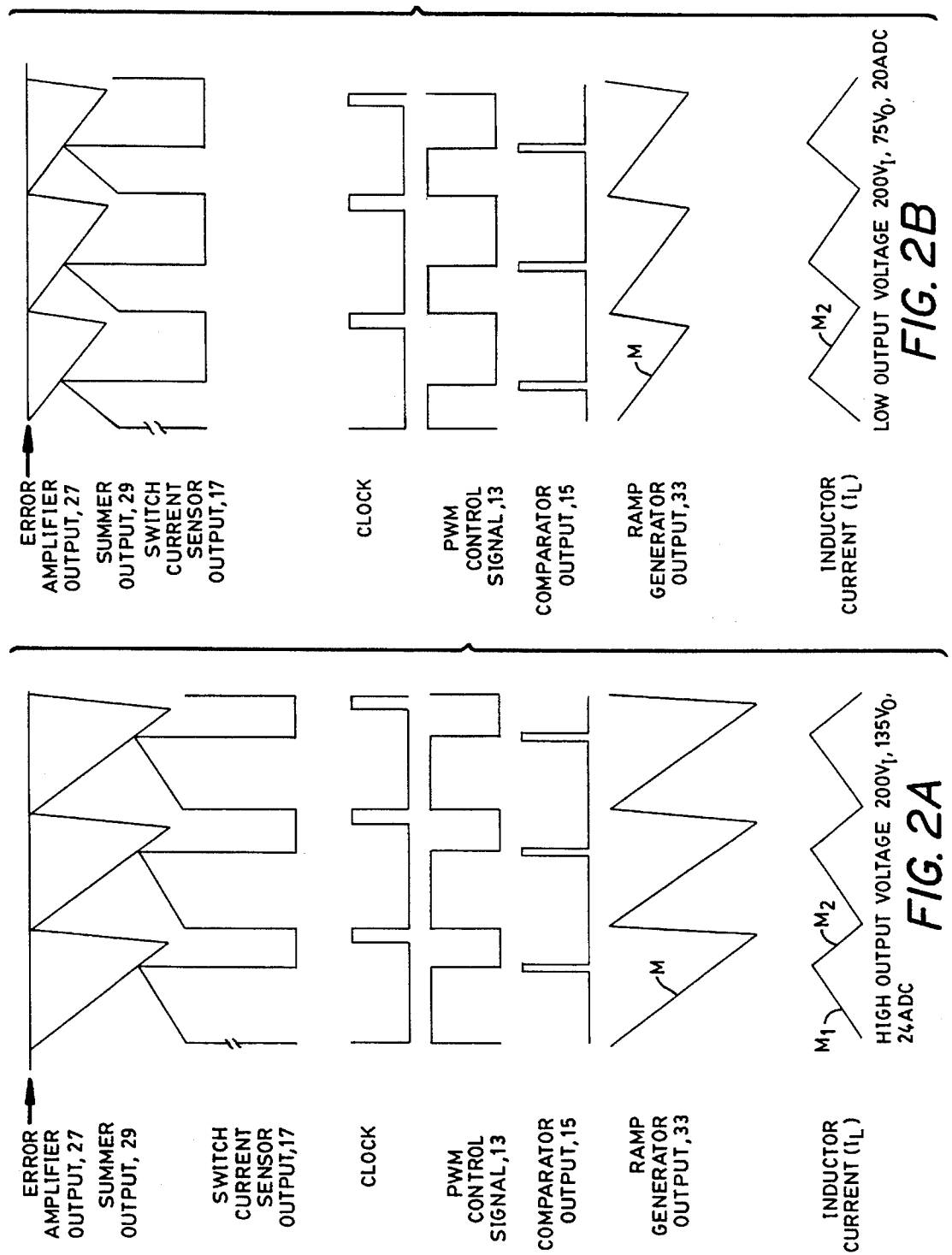
FIG. 2A and FIG. 2B are timing diagrams of the invention of FIG. 1 operating in a constant output current regulation mode showing the relevant waveforms during operating conditions of high output voltage and low output voltage respectively.

Referring now to FIG. 1, FIG. 2A and FIG. 2B, the timing relationship of various signals of the power converter 10 in the regulated current mode are shown in FIG. 2A and FIG. 2B for high output voltage and low output voltage conditions respectively from which the operation of the power converter 10 may be more clearly understood. The clock signal and timing are identified in both FIG. 2A and FIG. 2B. In FIG. 2A which represents operation at a high output voltage of 135 volts at 24 AMPS (DC), the error amplifier output 27 is represented as a straight line indicating a constant value, but under steady state conditions or with slowly varying changes in line or load, the waveform may vary; however, as shown here when viewed over several cycles only, the voltage at the error amplifier output 27 is very nearly constant in relation to the other waveforms in FIG. 2A. The summer output 29 is a summation of the ramp generator output 33 and the error amplifier output 27; hence, the summer output 29 appears to be the negative ramp generator output 33 biased to the error amplifier output 27 voltage level. The ramp generator output 33 waveform returns to the bias level of the error amplifier 26 upon the occurrence of a fixed ramp reset pulse within the ramp generator 32.

The switch current sensor output 17 waveform has an initial step due to the dynamics of the power converter 10. Initially, just before the switch 12 is turned-on, current flows through the catch rectifier 20 supplying energy to the load 24, and when switch 12 is turned-on, the junction 19 of the switch current sensor 18, the energy storer 22, and catch rectifier 20 begins to increase in voltage toward the input voltage $V_I$ thereby reverse biasing the catch rectifier 20 and driving it to an OFF state. Current previously flowing in the closed loop comprising the solenoid load 24, the catch rectifier 20, and the energy storer 22 now begins conducting through the switch 12 rather than the catch rectifier 20; the closed path now comprises the switch 12, the switch current sensor 18, the energy storer 22, and the solenoid load 24. The initial current step results from the inductive energy stored in the LC network of the energy storer 22. The inductor, inclined to maintain a constant current, commutates the instantaneous current through it from the catch rectifier 20 to the switch 12. The voltage across the inductor of the energy storer 22 when the switch 12 is ON, is the difference between the input DC voltage ($V_I$) and the output DC voltage ($V_o$) thereby causing the current through the switch 12 and the inductor current ($I_L$) to ramp up at a rate determined by the voltage across the inductor divided by the inductance; hence, an upward slope occurs on top of the switch current sensor output 17. When the inductor current ($I_L$) equals the summer output 29, action of the comparator 16 and the duty cycle controller 14 causes the switch 12 to commutate and stay off, thereby reducing switch current to zero. The inductor current ($I_L$) shown at the bottom of FIGS. 2A and 2B equals the switch current when the switch 12 is ON. When the switch 12 subsequently turns-off, action of the inductor causes conduction through the catch rectifier 20 forcing the junction 19 at the switch current sensor 18, catch rectifier 20 and the LC network 22 to acquire a voltage of one rectifier drop below the power return 21. The inductor therefore attains a voltage across it reversed in polarity to the voltage when the switch 12 is ON, but of a magnitude equal to the output voltage ($V_o$) plus a rectifier drop. For sufficiently high DC output voltages ($V_o$) and sufficiently low rectifier drop, the reversed voltage across the inductor during the switch OFF time is equal to the output voltage ($V_o$). Current through the inductor when the switch 12 is OFF tends to ramp downward (decreases) in value. When the next clock pulse initiates turn-on of the switch 12, the inductor current is not allowed to reach zero as predetermined by selection of an appropriately large inductor and/or a high clock rate. The average inductor current (DC current) equals a horizontal line drawn through the center of the inductor current waveform, the variation about this DC value, is referred to as the inductor current ripple. The clock signal shown in FIG. 2A for the present embodiment is 10 KHz, the width of the clock signal being 10 μS. Circuitry within the duty cycle controller 14 causes complete blanking (turn-off) of the transistor switch 12 whenever the clock pulse is active. This occurs in case the comparator 16 reset action has not yet occurred. Therefore, the maximum ON time of the switch 12 cannot exceed the period of the clock signal minus the width of the clock signal, or about 90 microseconds in this case. The switch 12 is turned-on when the clock signal undergoes a falling edge, which also lets the ramp generator output 33 begin ramping. When the PWM control signal 13 is at a high level, it turns-on switch 12, and when it is at a low level, turns-off switch 12. The duty cycle in FIG. 2A is approximately 68%, the switch being ON for 68% of the total clock period. The clock signal being approximately one-tenth of the clock period would prevent the switch duty cycle from rising in excess of 90% if such conditions were to occur.

Referring now to FIG. 2B, the waveforms shown are based on the power converter 10 operating at a low output voltage ($V_o$) of 75 volts at 20 AMPS DC with the following differences relative to FIG. 2A. The PWM control signal 13 shows that the switch 12 is on for lesser time than for the high voltage case in FIG. 2A, the duty cycle being approximately 38% in this operating condition. (The absolute minimum duty cycle allowable is determined by the minimum voltage from the error amplifier output 27). In addition, at the lower output voltage ($V_o$), the ramp at the top of the switch current sensor output 17 is steeper than in FIG. 2A because at the lower output voltage, the difference between the input and output is greater for a given input; therefore, the voltage across the LC network 22 is greater, thereby increasing the time rate of change of the inductor current ($I_L$). The inductor current ($I_L$) shows a corresponding decrease in the downward slope of the inductor current waveform, the reverse voltage across the inductor now being less during switch OFF period due to the lower output voltage.

The ramp generator output 33 being proportional to the output voltage ($V_o$) has a shallower slope at the lower output voltage than the higher output voltage, and in fact, because the downward slope ($M_2$) of the inductor current is also proportional to the output voltage when the switch is off, it can be seen that the ramp slope (M) is also proportional to the inductor current downward slope ($M_2$) regardless of operating point, i.e. operating output voltage ($V_o$). The ratio K is equal to the ramp slope (M) divided by the downward slope of the inductor current ($M_2$) as measured at the input terminals of the comparator 16 (or $K=M/M_2$). The load for the power converter 10, which is a focusing coil in this preferred embodiment requiring a constant load current rather than a constant output voltage, results in a power converter 10 that may have different operating output voltages depending on the particular focusing coil used. Constant current operation of the solenoid load 24 is required for proper operation of a focusing coil, the focusing depending on the magnetic field inside the coil, and the magnetic field for a properly designed solenoid being proportional to the current through it. In radar applications, a tightly controlled low ripple current is required. Furthermore, because the nature of the application allows the output voltage ($V_o$) to not be controlled except by the often loose characteristics of the solenoid (i.e. the output voltage is not directly regulated), the tracking of the ramp slope (M) with the inductor current downslope ($M_2$) allows for improved stability with respect to operating voltages. It is known for example from an article by S. Hsu, A. Brown, L. Rensink and R. D. Middlebrook entitled "Modelling and Analysis of Switching DC-to-DC Converters in Constant Frequency Current-Programmed Mode," IEEE PESC Record, 1979, pp. 284–301, that the stability of a current mode regulator to small perturbations about its steady state operation is highly dependent upon the choice of the ratio of ramp slope (M) and inductor downward slope ($M_2$). Improved operating point stability is therefore maintained by the invention despite the possible variations in output voltage ($V_o$).

In accordance with the references cited hereinbefore, it can be seen that two choices in particular allow for an "optimal control," optimal control implying optimization of some dynamic performance of the power converter 10. A first choice for a value of the ramp slope (M) of the ramp generator output 33 as measured at the comparator 16 input is for it to be equal to quantity one-half the inductor current downward slope ($M_2$) multiplied by the volts per ampere ratio of the switch current sensor output 17 also measured at the comparator 16 input. Such a value ($K=\frac{1}{2}$) optimizes the ripple rejection, making the fraction of the input voltage ripple which appears at the output voltage ($V_o$) to be a minimum. Such performance is highly desirable in radar systems because modulation of the solenoid focusing coil magnetic field causes variations in the amplitude and phase of the electromagnetic wave output of a traveling wave tube. Such modulation may act to limit the ability of the radar system to perform its desired function.

A second optimal control choice is for a ramp slope (M) of the ramp generator output 33 to be equal to the inductor current downward slope ($M_2$) times the switch current volts/ampere (K 1) again as measured at the input to the comparator 16. As in the Middlebrook reference, such a selection allows optimal control of the closed current loop (second feedback control loop). Corrective action of the closed current loop to injected noise (as may occur in noisy environments such as large scale, high power radar systems) occurs in a minimum time, minimizing any effect on the output voltage ($V_o$).

It is known that a ramp slope (M) greater than or equal to one-half the inductor current downslope ($M_2$), $K \geq \frac{1}{2}$ permits stable operation of a current mode converter regardless of duty cycle. However, in cases where high duty cycles occur (e.g. near 0.9), and where tolerances in a ramp slope (M) of one-half the downslope may cause the ramp to be shallower than one-half the inductor current downslope ($M_2$) (due to the normal tolerance and temperature specifications of components), the stability of the regulator may be compromised. For this reason, the "optimal" control chosen in the preferred embodiment is that optimal control at K=1 for the aforementioned stability concerns. It is realized that an "optimal" controlled design where $K=\frac{1}{2}$ would also result in a different form of optimal control. In fact, by virtue of generating the ramp in fixed proportion to any inductor current downslope, one could refer to this inherently as an "optimal" control. For example, a ramp slope choice of ¾ the inductor current downslope may be optimal for a given application depending on the requirements imposed by the application. The value K=¾ may be determined to be a desirable tradeoff between rejection of input ripple and noise stability of the power converter 10.

Although power converter 10 employs a Buck Converter topology 11 with the addition of a switch current sensor 18 for supplying current feedback 16, it is recognized that other alternate Buck family topologies such as the forward and bridge topologies, both well known in the art, are also members of the same topological family. It is further recognized that implementation of other topologies such as a Boost, or Buck-Boost also well known in the art, can easily be done with the principles of the invention. In particular, the optimal choice of ratio K=1 as also applied to the Boost and/or Buck-Boost topologies results in the same type of optimal control as in the Buck topology.

Figure 3:
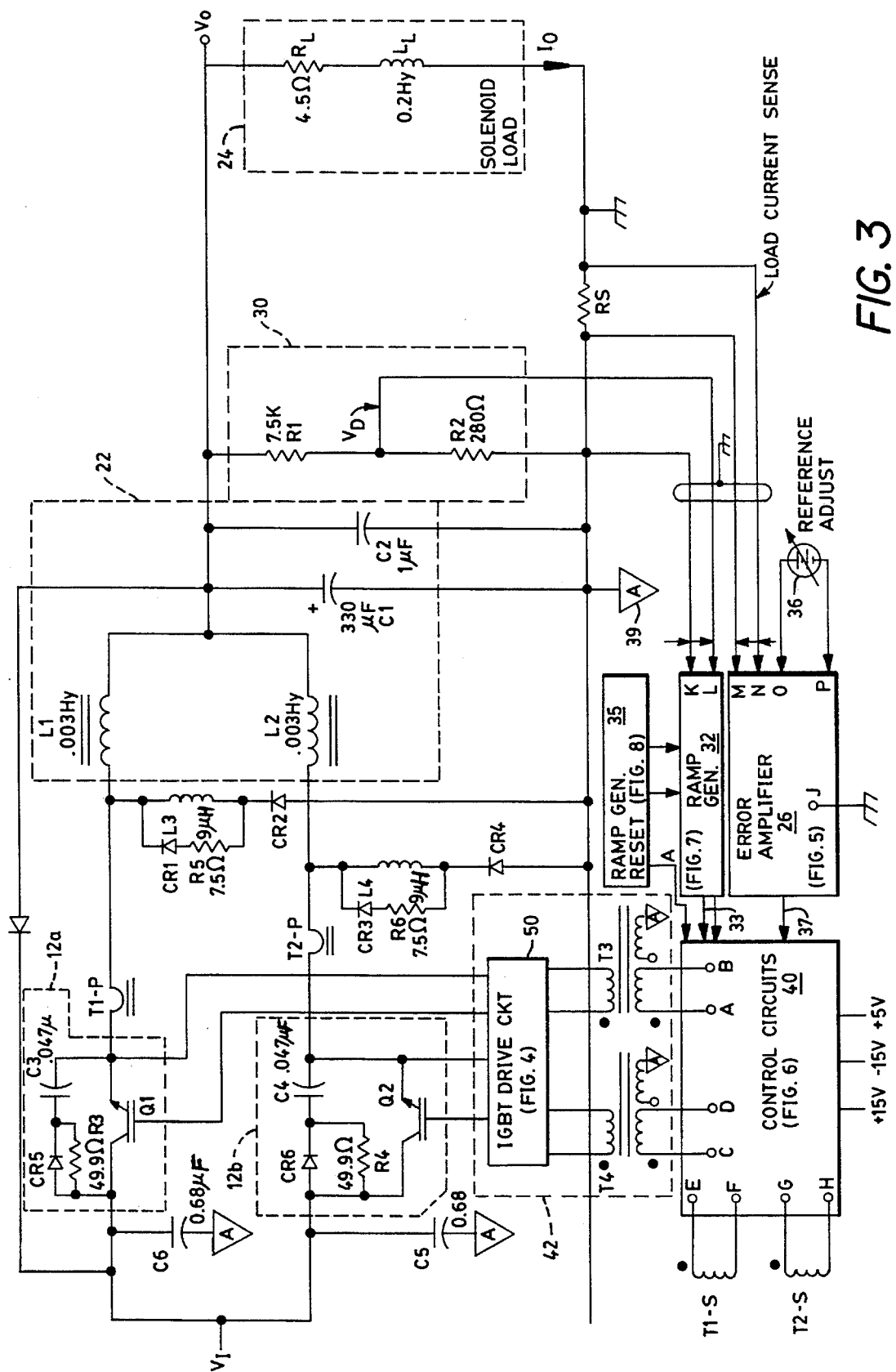
FIG. 3 is a functional block and schematic diagram of the invention.
Figure 6:
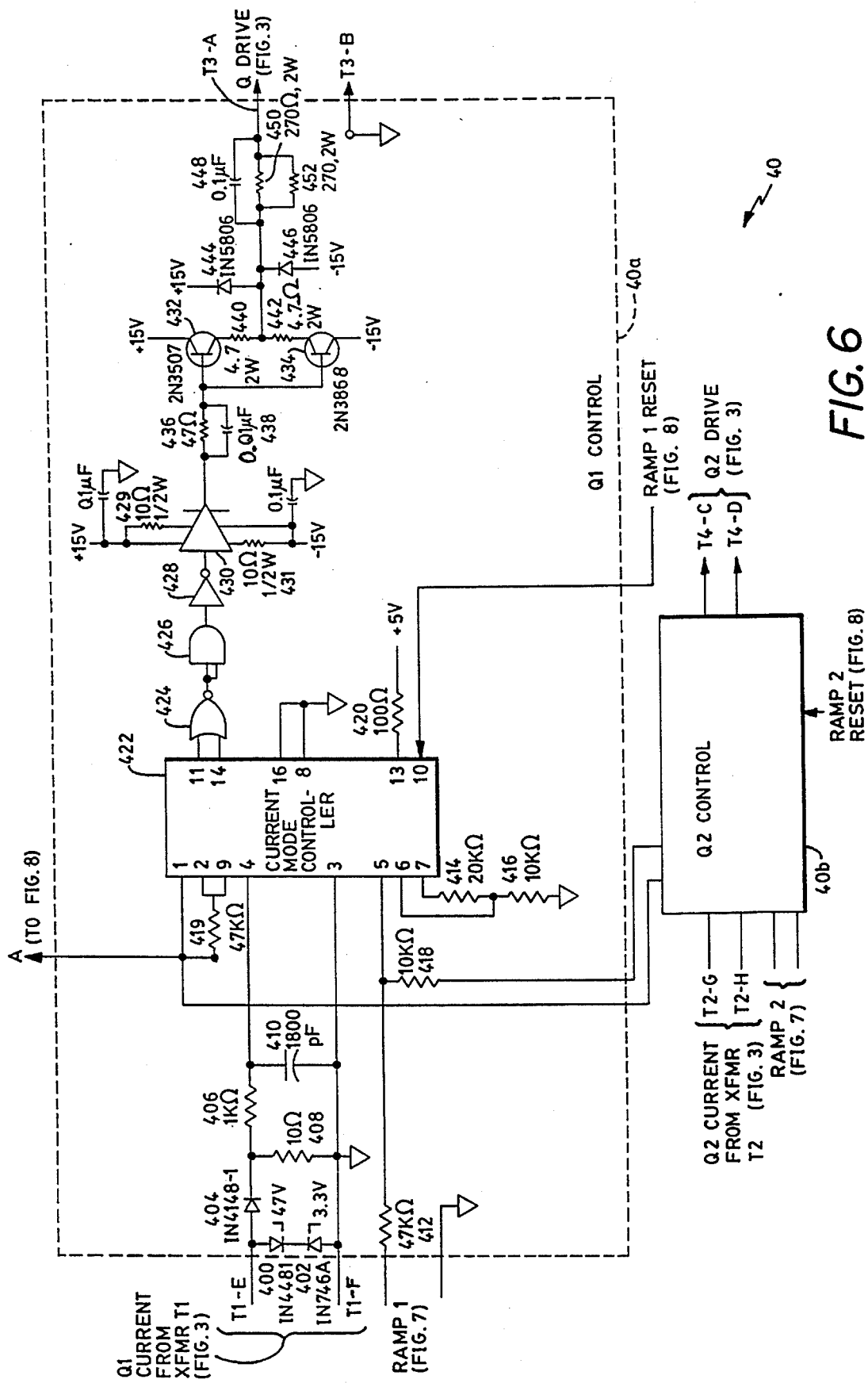
FIG. 6 is a schematic/block diagram of control circuits.

Referring now to FIG. 3, a preferred embodiment for power converter 10 is shown operating in a regulated load current mode; it comprises two parallel switches 12a, 12b, for the purpose of providing improved reliability by lowering the current through each switch means. The first switch 12a comprises components Q1, CR5, R3, and C3. Q1 is an insulated gate bipolar transistor (IGBT), although a field effect transistor device or other switching device capable of switching at the desired clock frequency and power could also be used. Devices CR5, R3, and C3 form a turn-off snubber circuit for Q1, the function of which is well known to those of ordinary skill in the art. The capacitor C3 limits the rate of rise of the reapplied voltage across Q1 thereby decreasing the power loss in Q1 due to the turn-off switching transition and limiting the rate of voltage rise to a controlled level consistent with a reliable switch operation. A high frequency capacitor C6 provides a local path for high frequency switching related harmonic currents thereby providing a bypass function. The second switch 12b comprises components Q2, CR6, R4, C4, with capacitor C5 as a local bypass capacitor. Transformers T1 and T2 comprise part of the switch current sensor 18 for each of the two switches 12a, 12b; the remaining circuitry of the switch current means which is connected to T1-S is shown in FIG. 6 at the input of Q1 control.

The energy storer 22 comprises L1 and L2, each being 3 milihenries in inductance at rated current, which are connected to filter capacitors C1 (330 μF) and C2 (1 μF). One skilled in the art will recognize that the energy storer 22 has two LC networks, one for each of the two switches 12a, 12b. In other applications where only one switch 12 is used then obviously only one inductor would be used. C1 is a polarized capacitor and provides electrostatic storage of energy in addition to filtering the output voltage. Capacitor C2 is a high frequency, plastic dielectric style capacitor for the purpose of attenuating high frequency switching harmonics, and preventing their interfering with the load. The catch rectifier 20 is implemented by diode CR4 (for switch 12b) and diode CR2 (for switch 12a). Components R6, CR3, and L4 are turn-on snubber devices for switch 12b, and they limit the rate of current buildup in the switch 12b during the overlap time between the switch conduction and the reverse recovery time of the catch diode CR4. This rate limit is accomplished primarily by inductor L4. Components R6 and CR3 then limit the backswing voltage across L4 when the catch diode (CR4) releases and begins to block reverse voltage. Components R5, L3, and CR1 similarly are turn-on snubber devices for switch 12a and catch diode (CR2).

Voltage divider 30 comprises resistive divider R1 and R2, the output of which is a 0.035 volts per output volt signal to the ramp generator 32 for the ultimate purpose of providing a ramp proportional to the output voltage ($V_o$). The output $V_D$ of the voltage divider 30 is fed to the ramp generator 32 and the ramp generator output 33 is fed to the summer 28 included in the control circuits 40.

The load 24 represented by $R_L$ and $L_L$ comprises an air wound electromagnet or solenoid focusing coil field. The proper operation of the electromagnet occurs by providing a well regulated constant current ($I_o$) from the power converter 10. Resistor $R_s$ is the load current sensor 25, and the voltage drop across it is proportional to the load current ($I_o$). A feedback voltage into the error amplifier 26 is therefore a negative voltage based on the choice of circuit ground. The power return 39 labelled by the A-return is ungrounded.

A drive circuit for each switch 12a, 12b is provided by a control output driver 42 comprising the insulated gate bipolar transistor (IGBT) drive circuits 50 (shown in FIG. 4) and transformers T3 and T4. The inputs to the IGBT drive circuits 50 are provided by the control circuits 40 via the 1:1 transformers T3 and T4 to achieve voltage isolation. A tertiary winding placed between the primary and secondary windings is used for shielding.

A reference adjust 36 is provided connected to an input of error amplifier 26 for adjusting the regulated output current or regulated output voltage depending on the mode of operation of the power converter 10. The error amplifier output 33 is fed to the summer 28 which is included in the control circuits 40. The ramp generator 32 generates the variable ramp generator output signal 33 from a voltage divider 30 used to continuously sample the power converter 10 output voltage ($V_o$). The ramp output is reset by ramp generator reset 35 outputs.

Figure 4:
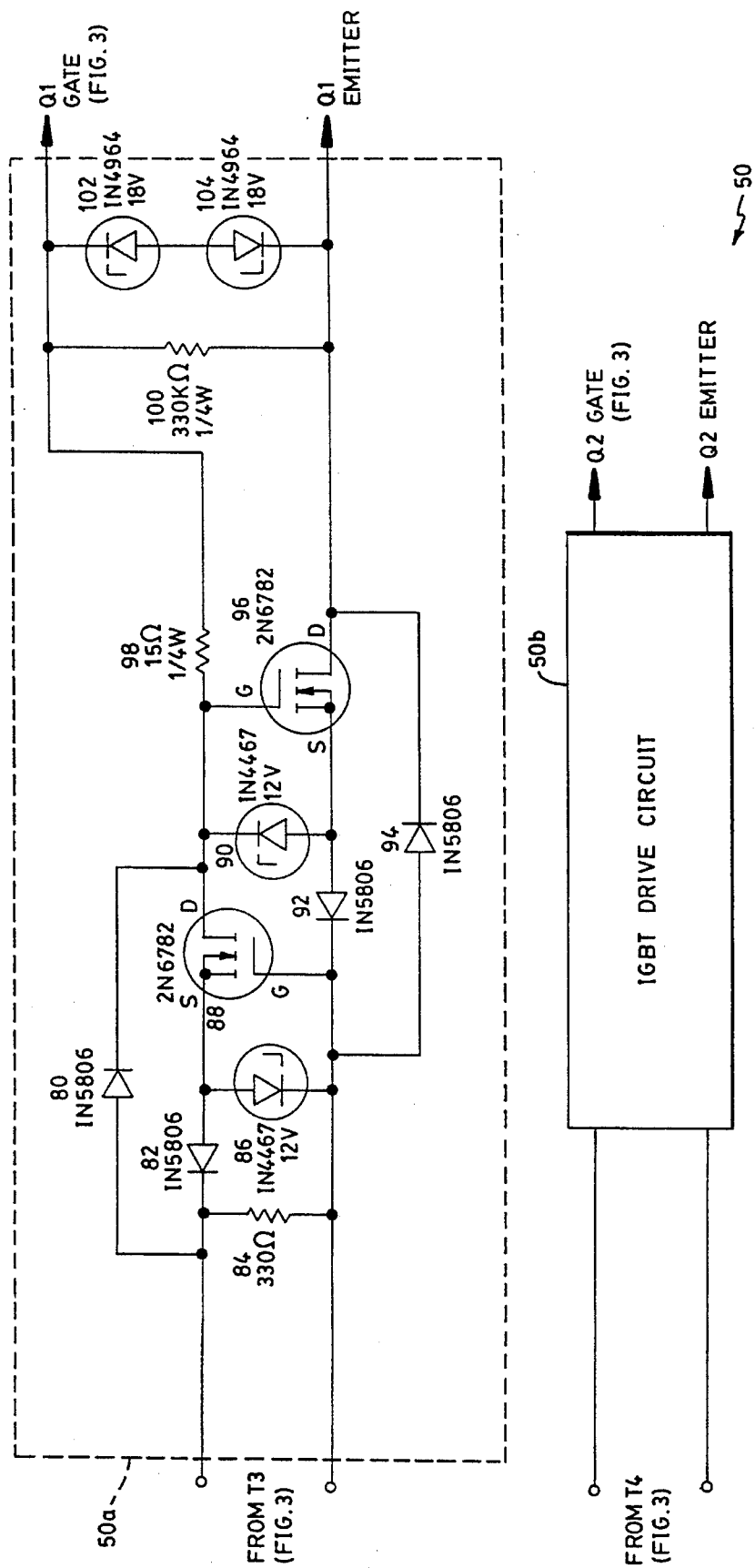
FIG. 4 is a schematic diagram of an insulated gate bipolar transistor (IGBT) drive circuit shown in FIG. 3.

Referring now to FIG. 4, two completely identical IGBT drive circuits 50a, 50b are shown, one for each switch 12a, 12b. Again it is pointed out there are two drive circuits to accommodate two switches 12a, 12b, there being two switches to improve reliability, but in other applications where only one switch 12 is used then obviously only one drive circuit would be required. Only drive circuit 50a will be described since drive circuit 50b operates similarly. The input to the drive circuit 50a is coupled by isolation transformer T3 to the drive output of the control circuit 40a (FIG. 6). Transformers T3 and T4 are designed with a controlled ET product. Specifically, they are intended to saturate such that the secondary voltage across T3/T4 has collapsed after approximately 10 μS. The remaining circuitry in FIG. 4 is designed to keep the gate to emitter voltage for IGBT devices Q1, Q2 (FIG. 3) high enough so as not to fall to the point where the bipolar output stage of the IGBT (Q1, Q2) becomes linear. The IGBT Q1 drive circuit 50a operates as follows. Assume initially that the IGBT switch 12a is OFF. A PWM control signal turn-on pulse (+15 V) from the output of Q1 control 40a (FIG. 6) is fed to the primary of T3. The charging current for the gate to emitter of the IGBT switch 12a flows through diode 80, through limit resistor 98, through the effective input capacitance of the device returning through low power FET 96 (2N6782), and finally through diode 92. FET 96 conducts because the charging current through diode 80 also charges up the gate to source of FET 96 driving it ON. After approximately 10 us, the transformer T3 has run out of ET product, saturates and the voltage across the secondary collapses. When this occurs, diode 80 becomes reverse biased, keeping the gate to emitter capacitance charged by preventing discharge current from flowing except through resistor 100 which is large in value (330 KΩ).

When the PWM control signal command is asserted to turn-off the IGBT switch 12a, an opposite (−15 volt) drive signal is issued from the output drive circuit 40a which performs the opposite function and discharges the input capacitance of the IGBT switch 12a. The discharge path is through diode 94, the input capacitance of the IGBT switch 12a, resistor 98, FET 88, and diode 82. When the signal is asserted to turn-off the IGBT switch 12a, FET 96 turns-off, and FET 88 turns-on by the action of the reverse voltage swing across the secondary of T3. Voltage regulators 86, 90 limit voltage from gate to source of the 2N6782 devices 88, 96 to 12 volts. Protection voltage regulators 102 and 104 prevent the absolute value of the gate to emitter voltage from exceeding 19 volts, a level safe for operating the IGBT devices Q1, Q2 (FIG. 3). These voltage regulators are mounted in close proximity to Q1, Q2. Resistor 100 is a gate to emitter terminating resistor. Resistor 84 is a damping resistor termination for the transformer (T3). Diode 92 prevents the inherent body diode (not shown) of device 96 (inherent to FET's) from conducting so as to prevent the possibility of spurious turn-on of device 96 which may occur when the turn-off pulse is initially activated. Similarly, diode 82 prevents the intrinsic diode of FET 88 from conducting so as to prevent a potential spurious turn-on of FET 88 when the turn-on drive is initially activated.

Figure 5:
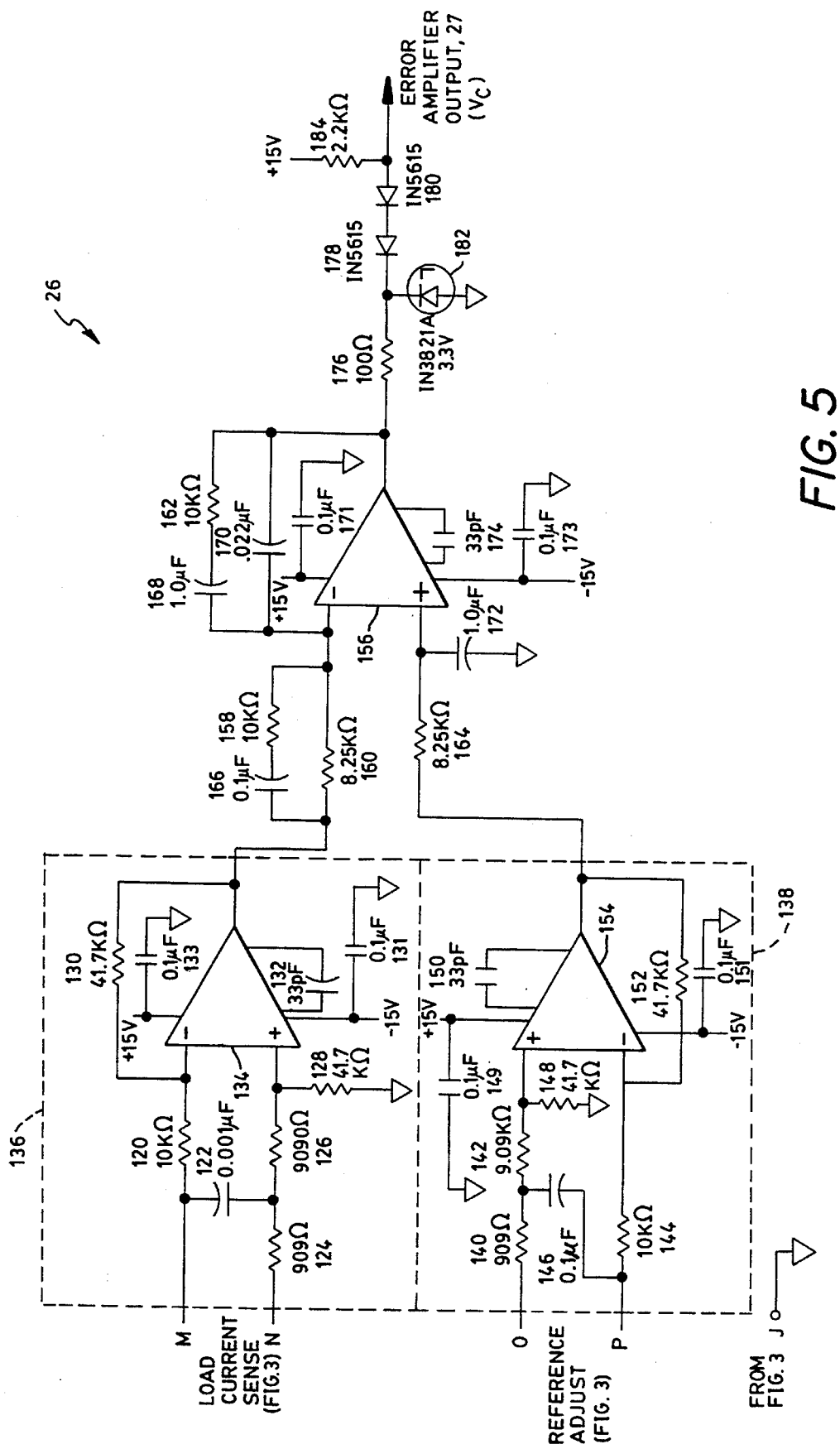
FIG. 5 is a schematic diagram of an error amplifier.

Referring to FIG. 5, a schematic diagram of the error amplifier 26 is shown. The voltage from the load current sensor 25 is fed to the input of a difference amplifier 136, comprising an operational amplifier 134, resistors 120, 124, 126, 128, 130, capacitors 122, 131, 132, and 133. Operational amplifier 134 is an LM108A generic device manufactured by National Semiconductor of Santa Clara, Calif., with capacitor 132 (33 pF) functioning as an external compensation capacitor as required for stable operation. The gain of the difference amplifier 136 is negative 4.17 and inverts the negative voltage from the load current sensor 25 (−0.1 volts/ampere) to a positive voltage. Capacitor 122 (0.001 uF) forms a low pass filter with resistor 124 for suppressing differential mode switching related conducted EMI. Capacitors 131 and 133 are 0.1 uF, general purpose ceramic capacitors used for bypassing high frequency noise on the power inputs to the operational amplifier 134. In this application it is necessary to position 131, 132 and 133 physically near operational amplifier device 134.

Similarly, the difference amplifier 138 comprises operational amplifier 154 (LM108A generic), capacitors 146, 149, 150, 151, and resistors 140, 142, 144, 148, 152. It has a gain of positive 4.17 on the adjustable reference, the adjustable reference being variable from positive 2.0 to 2.4 VDC which corresponds to a solenoid load current of 20 ADC to 24 ADC.

Still referring to FIG. 5, operational amplifier 156 is also a generic LM108A having a compensation capacitor 174 (33 pF) and is used to amplify the error between the signals at its inputs, the inputs being a feedback signal from differential amplifier 136 and a reference signal from differential amplifier 138. Operational amplifier 156 also provides frequency compensation for stability of the feedback loop, techniques of which are well known to one of ordinary skill in the art. The feedback compensation circuitry comprises capacitors 166, 168, 170 and resistors 158, 160, 162, 164, and forms an integrator with an additional 2-pole, 2-zero configuration required principally for compensating the large inductive reactance in the solenoid load 26 focusing coil. Resistor 164 and capacitor 172 provide additional filtering for improving the quality of the adjustable DC reference voltage at the non-inverting input of operational amplifier 156.

Resistor 176 is a 100 ohm resistor used during injection of a test sinusoidal frequency signal for the purpose of evaluating stability of the loop. Voltage regulator 182 (3.3 volts), diodes 178 and 180 in conjunction with resistor 184 (2.2 KΩ) set the dynamic range of the error amplifier output 27 control voltage ($V_c$) and also prevent the output control voltage ($V_c$) from becoming negative.

Referring now to FIG. 6, a schematic/block diagram is shown of the control circuits 40. Two control circuits 40a and 40b are shown in FIG. 6. Q1 control 40a provides the control for switch 12a and control circuit 40b provides the control for switch 12b. The description for Q1 control 40a is the same for Q2 control 40b. Components 400, 402, 404, 406, 408 and 410 form the switch current sensor 18, along with the current transformer T1 shown in FIG. 3. (T1 is a current transformer of fixed primary to secondary turns ratio 1:175 in the preferred embodiment). Turn-off of switch 12b therefore causes a current 1/175 times the switch current flowing through the secondary of T1. This secondary current to flow through resistor 408 (10 ohms) sets the volts/ampere of the switch sensing at 0.057 volts/ampere. Voltage regulators 400, 402 are needed to limit the reverse voltage developed across the T1 secondary when the switch current falls to zero, and the resetting action of T1 reverses the voltage across T1 secondary. This is accomplished principally by voltage regulator 400 which is a 47 volt device. The value of the zener voltage of device 400 is high enough to guarantee proper operation at maximum duty, but low enough to reliably allow for the reverse voltage rating of diode 404 which is a generic 1N4148-1. The purpose of diode 404, which is reverse biased when the core of T1 resets, is to isolate the relatively high voltage transformer backswing from the low voltage control circuitry. Resistor 406 and capacitor 410 form a low pass filter rolling off at 88.4 Khz, a frequency which provides as much filtering as possible given the stability constraints of the inner current loop feedback. This low pass filter is needed specifically to filter any leading edge current spikes through the switch which may occur due to the reverse recovery characteristics of the catch rectifier 20 which may appear momentarily as a short during conduction overlap with the switch 12.

The current mode controller 422 is embodied with a model UC1846J integrated circuit manufactured by Unitrode Corporation, of Lexington, Mass. It provides the functions required for generating a pulse width modulated control signal 13 output using current mode control in the power converter 10. However, an internal error amplifier of device 422 is not employed functionally as an error amplifier, but rather as a summing amplifier, performing the required summer 28 function. The summing components are resistors 412, 414, 416, and 418. Using the resistor values shown in FIG. 6, the summer output 29 (shown in FIG. 1) is 0.26 times the ramp generator output 33 plus 1.2 times the error amplifier output 27. The slope of the ramp at the comparator output 15 is derived as follows: The switch current sensor output 17 at the comparator 16 is typically 0.057 V/A times a gain of 2.75 where the 2.75 times gain results from a difference amplifier inherent to the current mode controller 422 resulting in a current sense equivalent resistance of 0.157 V/A at the comparator 16.

The current mode controller 422 performs the pulse width modulation pursuant to the current mode control by combining comparator, latch, and steering logic. NOR gate 424 allows the PWM output to exceed 50% duty (but limited to 90% as aforementioned). The PWM control signal 13 is the output of NOR gate 424 and, except for propagation delays and level shifting, is used directly to drive switch Q1. The PWM control signal 13 is not meant to connote a separate type of control commonly referred to as PWM which does not employ feedback of current, but rather refers to the controlling signal which is pulse width modulated. The outputs at pins 11 and 14 of the current mode controller 422 are each at ½ the synchronizing input frequency at input pin 10 of 422; however, the output of the NOR gate 424 results in a 10 Khz switch drive signal, and permits a duty cycle above 50% as required. Resistor 420 is a 100 Ω pull-up resistor required by the open collector totem pole output of 422. Gate 426, 428 is a TTL to CMOS conversion IC, generic part DS7800H, manufactured by National Semiconductor, of Santa Clara, Calif., converting and inverting the TTL output of NOR gate 424 to a ±15 volt drive needed for driving the MOS type input of the transistor switch 12. Current amplifier 430 is a generic LH0002, manufactured by National Semiconductor, of Santa Clara, Calif., used to provide sufficient drive for the push pull transistor drive arrangement formed by transistors 432 and 434. Resistor 436 and capacitor 438 form a drive circuit coupling impedance, capacitor 438 being a speedup capacitor. Resistors 440, 442 provide a current limiting function for the push pull transistors 432 and 434 when driving the switch 12, and serve to limit potential shoot through current spikes as may occur in such drive circuits.

Diodes 444, 446 limit voltage spikes at the push pull transistors 432, 434, while capacitor 448 and resistors 450, 452 serve as a series impedance for the transformer coupled IGBT drive circuit 50b, with capacitor 448 acting as an AC coupling capacitor. The resistive elements protect against unwanted inadvertent backswings of the drive transformers T3, should the volt-microsecond product of the transformer voltage become slightly imbalanced at low and/or very high duty cycles.

Figure 7:
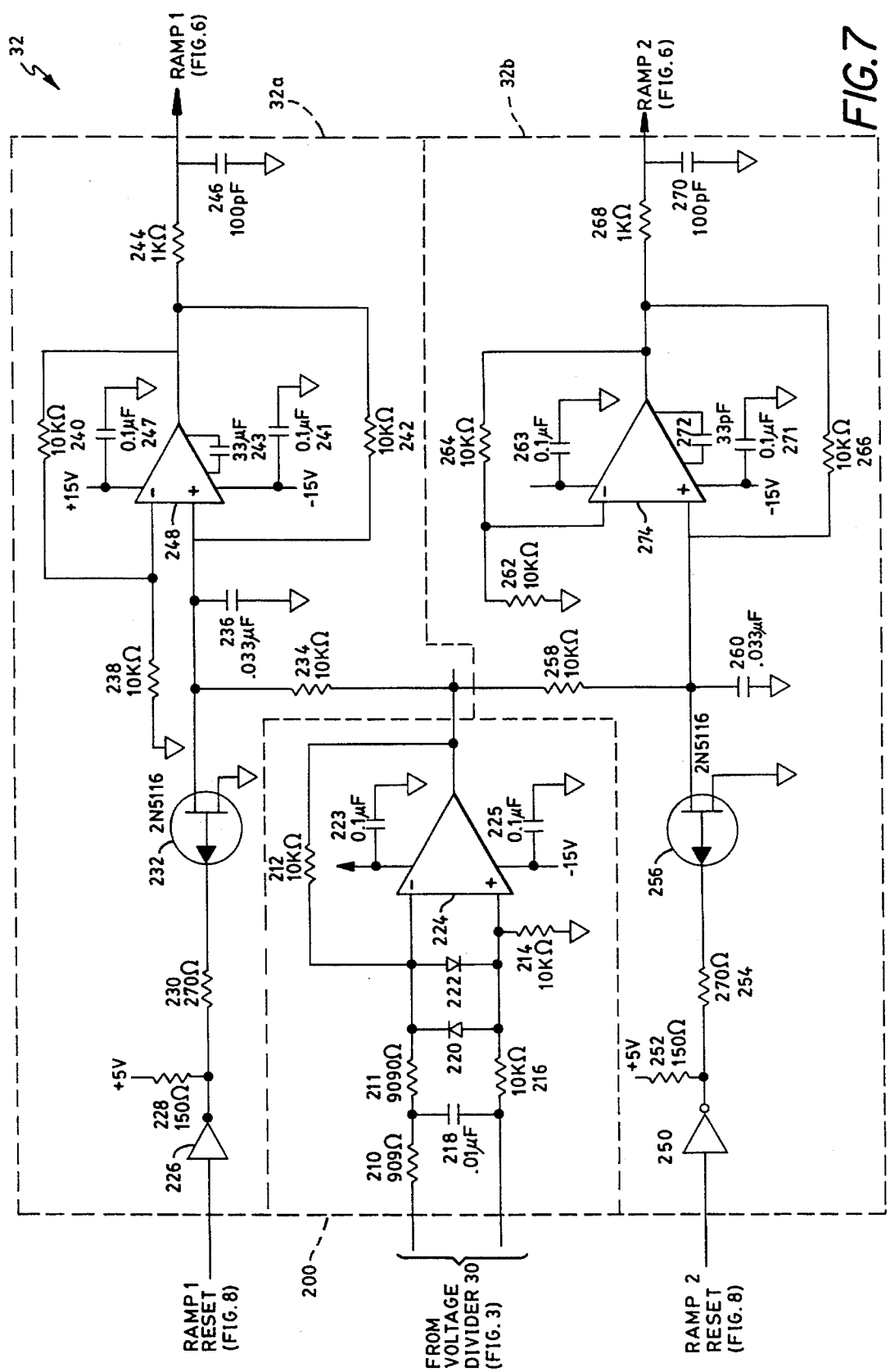
FIG. 7 is a schematic diagram of a ramp generator.

Referring now to FIG. 7, a schematic diagram of the ramp generator 32 is shown comprising a first section 32a for generating Ramp 1 and a second section 32b for generating Ramp 2 which are fed to Q1 control 40a and Q2 control 40b in FIG. 6. The output of the voltage divider 30 is fed the input to an inverting unity gain difference amplifier 200 comprising operational amplifier 224, resistors 210, 211, 212, 214, 216, capacitors 218, 223, 225 and diodes 220 and 222. Operational amplifier 224 is a 741 generic device. Resistors 210, 211, 212, 214 and 216 are required for the difference amplifier gain, and the common mode rejection depends on matching such resistors in value over the appropriate temperature operating range of the circuit. Capacitor 218 in concert with resistor 210 forms a low pass filter for preventing differential, high frequency, switching related ripple and its harmonics from interfering with the proper operation of the ramp generator 32. Capacitors 223 and 225 are 0.1 microfarad, general purpose ceramic capacitors for bypassing of the power input to operational amplifier 224.

Operational amplifier 248 and capacitors 236, 243, and resistors 238, 240, 242, and 234 generate the Ramp 1 output signal of section 32a, the slope of which is proportional to the output of difference amplifier 200, thereby being proportional to the output of voltage divider 30, thereby also being proportional to power converter 10 output voltage ($V_o$). The circuit works as a voltage controlled, constant current generator driving a capacitive load, the capacitive load being 236, (0.033 microfarad). Resistors 238, 240, 242, 234 form the resistive network around operational amplifier 248 delivering a constant current to capacitor 236, this current being proportional to the output of operational amplifier 224. Constant current through capacitor 236 causes the voltage to ramp linearly, having a negative slope due to the negative output of amplifier 224 (for a positive output of voltage divider 30). Resistors 240 and 238 provide negative feedback around amplifier 248 allowing the output of operational amplifier 248 to be twice the voltage across capacitor 236. This voltage ramp being linear causes the output of operational amplifier 248 to be linear. The slope of the ramp at operational amplifier 248 output equals quantity two times the output of operational amplifier 224 divided by quantity 10000 ohms times capacitance of 236, the latter being 0.033 microfarads. Resistor 244 and capacitor 246 provide low pass filtering for the purpose of attenuating fast noise transients, but to not cause appreciable distortion of ramp linearity. Ramp 1 is reset by Ramp 1 reset signal (FIG. 8) which is a synchronizing pulse identical to that used to clock the duty cycle controller 14 (see FIG. 9), the synchronizing pulse being a logic level 1 for reset. Logic level 1 causes the output of inverting buffer 226, to go to a logic state 0, and P-channel FET 232 subsequently discharges capacitor 236, thereby resetting the ramp generator to zero volts. The P-channel FET 232 is embodied by a generic 2N5116. When the synchronizing pulse (Ramp 1 reset) returns to logic 0, FET 232 turns-off, allowing the Ramp 1 signal to begin a new ramp cycle. Triggering of the transistor Q1 to an ON conduction state is accomplished by duty cycle control 14 acting on the falling edge of the some synchronizing Ramp 1 reset signal thereby synchronizing the initiation of the ramp generator 32 and turn-on of transistor switch 12 except for small propagation delays inherent in real time operation of all electrical circuits.

Figure 9:
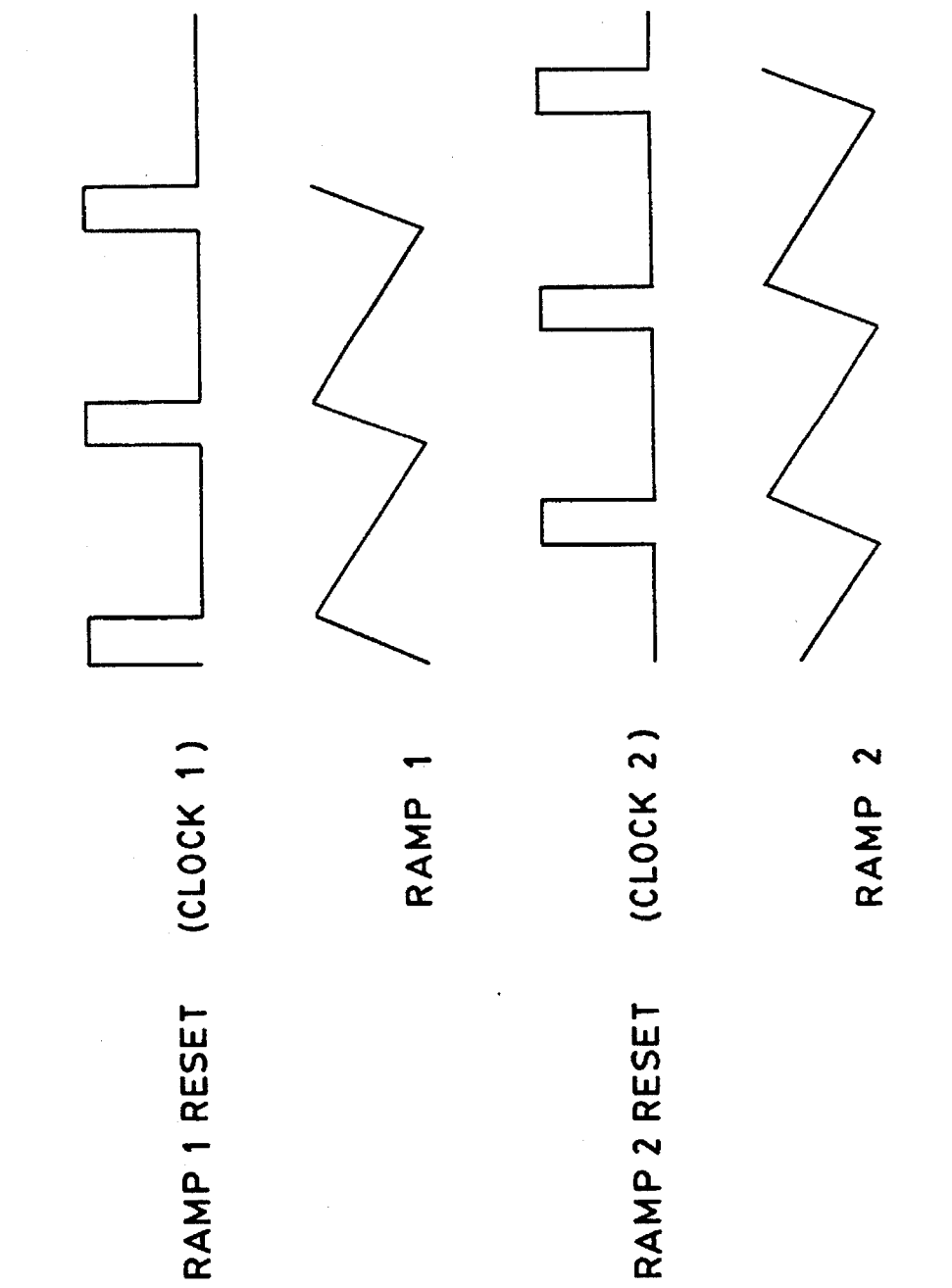
FIG. 9 is a timing diagram showing the timing relationship between Ramp 1 reset and Ramp 2 reset signals for the ramp generator of FIG. 7.

Section 32b of ramp generator 32 generates the Ramp 2 signal for transistor switch 12b in FIG. 3. It comprises operational amplifier 274, capacitors 260, 263, 271 and 270, resistors 262, 264, 258, 266, 268, P-channel FET 256, logic inverter 250, and resistors 252, and 254, and it functions similarly as described for ramp generator section 32a. As shown in FIG. 9, the synchronizing pulse (Ramp 2 reset) for the second ramp generator section 32b is equidistantly spaced between synchronizing pulses (Ramp 1 reset) for the first ramp generator section 32a but clocked at the same rate as the synchronizing pulse for the first ramp generator section 32a. Transistor switch 12b in FIG. 3, turns-on as commanded, thus being phase shifted by 180 degrees in relation to switch 12a turn-on.

The value of the aforementioned ratio is determined as follows: The falling inductor current slope ($M_2$) during the transistor switch 12 OFF period is approximately the output voltage ($V_o$) divided by the inductance of the energy storer 22 which is 0.003 henries. Using the equivalent current sensor resistance of 0.157 V/A, the falling inductor current slope ($M_2$) is therefore equal to 52.3 times the DC output voltage in volts, the final result being in volts per second. The ramp generator 32 output of FIG. 7 is calculated as follows: the voltage divider 30 output is 0.035 volts per volt of output voltage ($V_o$). A times −1 difference amplifier 200 of FIG. 7 in the ramp generator 32 yields an output of −0.035 times $V_o$, the latter being the converter output voltage. The ramp generator output 33 therefore has a slope of $-0.070\ V_o/(10{,}000\ \Omega * 0.033\ \mu F) = -212$ times $V_o$. With $V_o$ in volts, the final result is in volts/second. The summing amplifier (comprising 412, 414, 416, 418 and the internal amplifier of 422) reduces the gain to −55 times $V_o$ which except for small differences resulting from component matching, is identical to the falling inductor current slope ($M_2$). Therefore, the inductor current downslope during the off time of the transistor switch 12 equals the slope ($M_2$) of the ramp generator 32 at the comparator 16. Therefore, regardless of output voltage ($V_o$), the slope of the ramp at the comparator 16 equals the voltage representation of the downward inductor current slope $M_2$. Therefore K=1 in the preferred embodiment.

Figure 8:
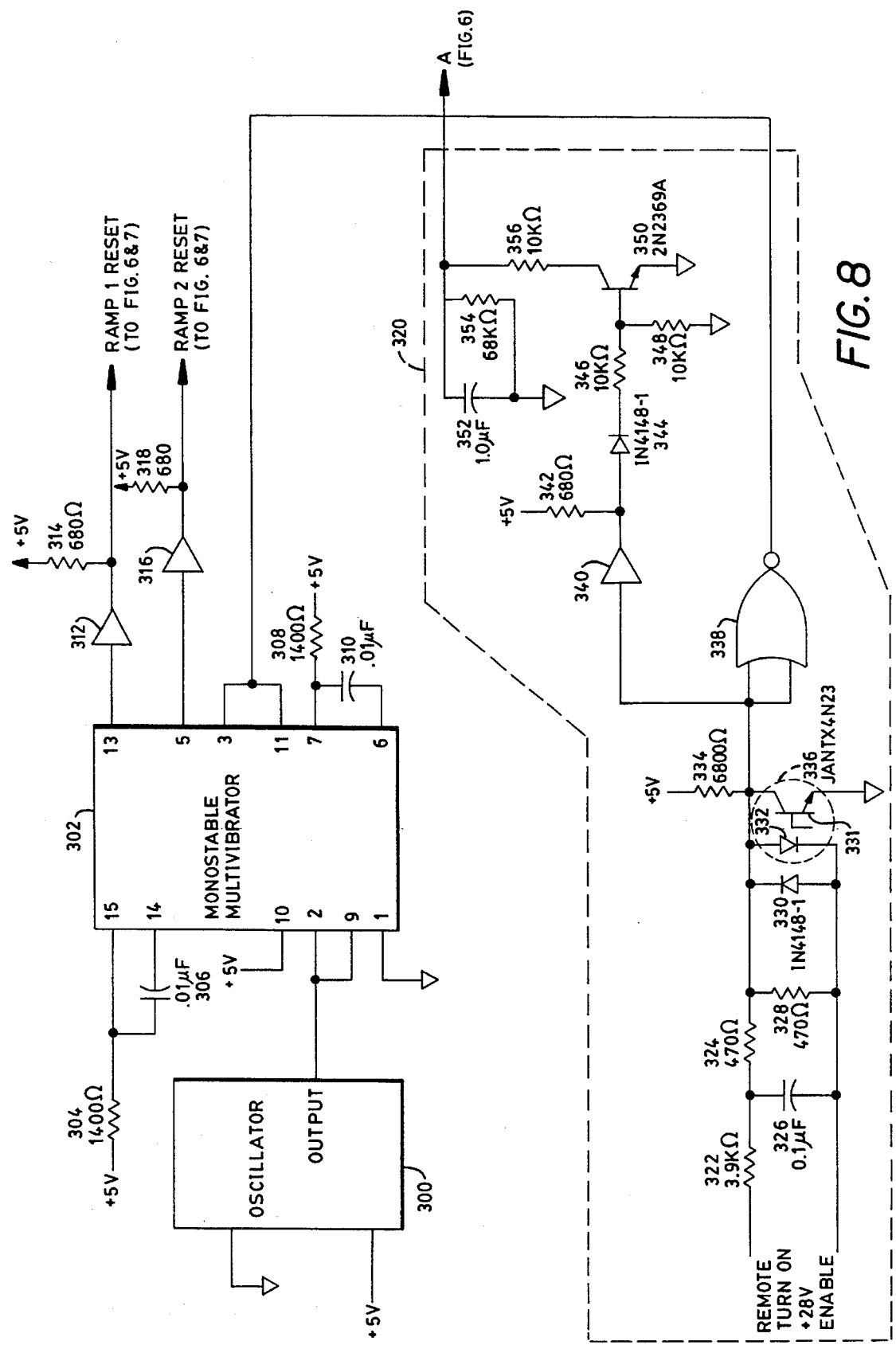
FIG. 8 is a schematic block diagram of a circuit for generating ramp generator reset signals.

Referring now to FIG. 8 and FIG. 9, a schematic/block diagram is shown in FIG. 8 of a circuit for generating the ramp reset signals, Ramp 1 reset and Ramp 2 reset. In addition, FIG. 8 shows a remote start-up circuit 320 for the power converter 10. Oscillator 300 is a square wave, TTL compatible crystal oscillator operating at 10 KHz, fanning out to drive both sections of a generic 54LS221 dual monostable multivibrator 302. A first half of multivibrator 302 is triggered by the leading edge of the oscillator 300 output, and a second half of multivibrator 302 is triggered by the falling edge of the oscillator 300 output. Hence, the multivibrator 302 provides two synchronizing pulses, Ramp 1 reset and Ramp 2 reset, phase shifted by 180 degrees which are also used in clocking the current mode controller 422 and its counterpart in 40b of FIG. 6. Resistors 304 and 308 and capacitors 306 and 310 are the timing components, providing a 10 μS output pulse to synchronize turn-on of each IGBT transistor switch 12a, 12b, and to additionally reset the respective ramp generators 32a, 32b. Non-inverting drivers 312 and 316 are TTL buffer circuits with open collector resistors 314 and 318. The output of buffer amplifier 312 is Ramp 1 reset which triggers the current mode controller 422 in FIG. 6 resulting in turn-on of switch 12a (FIG. 3) delayed only by inherent circuit propagation times. Turn-on occurs at the trailing edge of the 10 μS pulse. Additionally, the 10 μS pulse resets the ramp generator section 32a for switch 12a, letting go of the ramp at the same time the switch turns-on. As noted, the 10 μS synchronizing pulse additionally blanks all PWM output pulses from the current mode controller 422 producing a maximum possible duty cycle of 90% for a 10 KHz clock. The output of buffer amplifier 316 is Ramp 2 reset which provides the same function for switch 12b, but is phase shifted by 180 degrees from switch 12a as shown in FIG. 9.

The remote start-up circuit 320 comprises resistors 322, 324 which are current limiting devices for the remote turn-on 28 volt enable command; capacitor 326 provides immunity from noise by creating low pass filtering. Resistor 328 provides additional thresholding of the input voltage to protect against false triggering. Optoelectronic device 336 is an optocoupler with pull-up resistor 334 and protective diode 330; it may be embodied by generic 4N23. NOR gate 338 is configured as an inverter. When a 28 VDC signal is applied to the input, the inputs to the NOR gate 338 are pulled low by action of the optocoupler transistor 331 and pull-up resistor 334. The NOR gate 338 output going to a logic high is used as an enable signal to allow pulsing of the monostable multivibrator 302 to begin. The clear input at pins 3 and 11 are active low signals. In the absence of a remote turn-on 28 V command, the output of NOR gate 338 is low thereby clearing both halves of the dual monostable multivibrator 302. The presence of the remote turn-on 28 V command results in the outputs of the Ramp 1 reset and Ramp 2 reset pulses from the dual monostable multivibrator 302 for the aforementioned purpose of providing a turn-on pulse to switches 12a, 12b, and resetting the ramp generator 321 and 32b. The embodiment operates in the following manner. The low voltage control power to the control circuits shown in FIGS. 5, 6 and 8 are applied first, followed by application of the remote +28 V enable signal, and the input DC voltage applied through a remote controlled circuit breaker.

The circuitry comprising components 340 through 356 and resistor 419 of FIG. 6 form a soft start and minimum duty cycle circuit. With no +28 V remote enable input, the input to gate 340 is a logic high. Bipolar transistor 350, a general purpose low power 2N2369 device, is therefore fully conducting. Resistor 419 of FIG. 6 is connected to the internal 5.1 volt reference of current mode controller 422. With transistor 350 ON, the voltage at pin 1 of current mode controller 422 and its counterpart in control circuit 40b equals 1.06 volts. This is the current limit, soft start input to the current mode controller 422. This voltage essentially appears at the comparator 16 input (minus 0.5 volts internal drop) normally set aside for the summer 28. The start-up sequence therefore begins with one end of the comparator 16 at 0.56 volts. This limits the initial current to quantity 0.56 volts divided by quantity 0.157 volts/amp =3.6 amperes. The initial start-up sequence proceeds as follows: The initial turn-on pulse width is limited to a current of 3.6 amps if the IGBT switch current is such that the duty cycle for such switch current is less than 90% of the clock period, otherwise, the pulse width would be limited to 90% of the clock period. When the remote turn-on +28 V enable command is active, transistor 350 (2N2369A) has turned-off, allowing soft start capacitor 352 to charge-up, ultimately to 3.02 volts. As capacitor 352 charges-up, the current limit at pin 1 of current mode controller 422 and its counterpart in 40b which was initially 1.06 volts, ramps up with it. Eventually when regulation is achieved, this soft start voltage continues to its final value of 3.02 volts. During steady date operation, this 3.02 volt input to pin 1 of the current mode controller 422 and its counterpart in 40b serves a second function, that of completely current limiting the switch current. The 3.02 volts (minus the 0.5 volts internal source) sets a maximum voltage at the input to the comparator 16, and therefore acts to limit the absolute current in the IGBT transistor switches (Q1 and Q2) to quantity 3.02 volts minus 0.5 volts divided by quantity 0.157 V/A = 16 amperes which is lower than the maximum current through each transistor switch (Q1/Q2) during normal operation. This permits absolute pulse by pulse current limiting in any of the two switches 12a and 12b to a peak value sufficiently within the rating of each transistor switch.

This concludes the description of the preferred embodiment. However, many modifications and alterations will be obvious to one of ordinary skill in the art without departing from the spirit and scope of the inventive concept. For example, when the power converter 10 is operating in the mode for regulation of output voltage, feedback of output voltage is applied by the voltage divider 30 to the error amplifier 26. Also, appropriate scaling of the reference 36 is required. However, the voltage divider 30 may be coupled to the ramp generator 32 and a separate voltage coupled to the error amplifier 26. Therefore, it is intended that the scope of this invention be limited only by the appended claims.

What is claimed is:

1. A power converter comprising:

an input DC voltage ($V_f$);

switching means having ON and OFF states coupled to said DC voltage for passing said voltage in accordance with a control signal fed to said switching means;

means coupled to said switching means for sensing a current passing through said switching means when said switching means is in said ON state;

energy storage means coupled to said current sensing means for maintaining a continuous output load current from said power converter when said switching means is in said OFF state;

means for generating said control signal for said switching means in accordance with a clock signal having a predetermined frequency, a first feedback control signal, a second feedback control signal and a third feedback control signal;

means for sensing an output voltage of said power converter or said output load current to provide regulation of said sensed output voltage or output load current;

means coupled to said output sensing means and a predetermined output reference signal for generating said first feedback control signal;

said second feedback control signal being generated by said means for sensing said current passing through said switching means;

means coupled to said output voltage of said power converter at the output of said energy storage means for continuous sampling of said output voltage; and means coupled to said output voltage sampling means for generating said third feedback control signal.

2. The power converter as recited in claim 1 wherein said control signal generating means comprises:

means for summing said first feedback control signal and said third feedback control signal;

comparator means coupled to an output signal of said summing means and an output signal of said switch current sensing means for generating a reset signal when said output signals are equal in value; and means coupled to said reset signal and a predetermined frequency clock signal for generating said switch control signal.

3. The power converter as recited in claim 1 wherein:

said energy storage means comprises a diode coupled to a junction of said sensing means and said energy storage means for providing a path for said output load current when said switching means is in said OFF state.

4. The power converter as recited in claim 1 wherein:

said first feedback control signal generating means comprises an error amplifier for detecting variations of said sensed output relative to said predetermined output reference signal.

5. The power converter as recited in claim 2 wherein:

said second feedback control signal provides a voltage representation of said current passing through said switching means for comparison with the output of said summing means.

6. The power converter as recited in claim 1 wherein:

said third feedback control signal generating means comprises a ramp generator for providing a variable ramp signal having a slope which is proportional to said power converter output voltage, said ramp signal being reset to an initial value by said clock signal.

7. The power converter as recited in claim 6 wherein:

said energy storage means comprises an inductor-capacitor filter wherein a current through said inductor has a rising slope and a falling slope, said falling slope being proportional to said power converter output voltage; and a ratio of said slope of said ramp signal to said falling slope of said inductor current being a constant produces improved dynamic operation of said power converter.

8. A power converter comprising:

an input DC voltage ($V_I$);

switching means having ON and OFF states coupled to said DC voltage for passing said voltage in accordance with a control signal fed to said switching means;

means coupled to said switching means for sensing a current passing through said switching means when said switching means is in said ON state;

energy storage means coupled to said current sensing means for maintaining a continuous output load current from said power converter when said switching means is in said OFF state;

means for generating said control signal for said switching means in accordance with a clock signal having a predetermined frequency, a first feedback control signal, a second feedback control signal and a third feedback control signal;

means for selecting a predetermined mode of operation for said power converter, a first mode of operation regulating an output load current and a second mode of operation regulating an output voltage, said selecting means having a first feedback input representative of said output load current and a second feedback input representative of said output voltage;

means coupled to an output load for sensing said continuous output load current, said sensing means providing said first feedback input to said selecting means;

means coupled to said selecting means and a predetermined reference signal for generating said first feedback control signal;

said second feedback control signal being generated by said means for sensing said current passing through said switching means;

means for continuous sampling of said output voltage of said power converter, said continuous sampling means providing said second feedback input to said selecting means; and means coupled to said output voltage sampling means for generating said third feedback control signal.

9. The power converter as recited in claim 8 wherein said control signal generating means comprises:

means for summing said first feedback control signal and said third feedback control signal;

comparator means coupled to an output signal of said summing means and an output signal of said switch current sensing means for generating a reset signal when said output signals are equal in value; and means coupled to said reset signal and a predetermined frequency clock signal for generating said switch control signal.

10. The power converter as recited in claim 8 wherein:

said energy storage means comprises a diode coupled to a junction of said sensing means and said energy storage means for providing a path for said output load current when said switching means is in said OFF state.

11. The power converter as recited in claim 8 wherein:

said first feedback control signal generating means comprises an error amplifier for detecting variations of said regulated output of said selected mode of operation relative to said predetermined reference signal.

12. The power converter as recited in claim 9 wherein:

said second feedback control signal provides a voltage representation of said current passing through said switching means for comparison with the output of said summing means.

13. The power converter as recited in claim 8 wherein:

said third feedback control signal generating means comprises a ramp generator for providing a variable ramp signal having a slope which is proportional to said power converter output voltage, said ramp signal being reset to an initial value by said clock signal.

14. The power converter as recited in claim 13 wherein:

said energy storage means comprises an inductor-capacitor filter wherein a current through said inductor has a rising slope and a falling slope, said falling slope being proportional to said power converter output voltage; and a ratio of said slope of said ramp signal to said falling slope of said inductor current being a constant produces improved dynamic operation of said power converter.

15. A power converter for regulating output load current comprising:

an input DC voltage ($V_I$);

switching means having ON and OFF states coupled to said DC voltage for passing said voltage in accordance with a control signal fed to said switching means;

means coupled to said switching means for sensing a current passing through said switching means when said switching means is in said ON state;

energy storage means coupled to said current sensing means for maintaining a continuous output load current from said power converter when said switching means is in said OFF state;

means for generating said control signal for said switching means in accordance with a clock signal having a predetermined frequency, a first feedback control signal, a second feedback control signal and a third feedback control signal;

means coupled to an output load of said power converter for sensing said output load current;

means coupled to said output load current sensing means and a predetermined output current reference signal for generating said first feedback control signal to maintain a constant output load current;

said second feedback control signal being generated by said means for sensing said current passing through said switching means;

means coupled to an output voltage of said power converter at the output of said energy storage means for continuous sampling of a portion of the output voltage; and means coupled to said output voltage sampling means for generating said third feedback control signal.

16. The power converter as recited in claim 15 wherein said control signal generating means comprises:

means for summing said first feedback control signal and said third feedback control signal;

comparator means coupled to an output signal of said summing means and an output signal of said switch current sensing means for generating a reset signal when said output signals are equal in value; and means coupled to said reset signal and a predetermined frequency clock signal for generating said switch control signal.

17. The power converter as recited in claim 15 wherein:

said energy storage means comprises a diode coupled to a junction of said sensing means and said energy storage means for providing a path for said output load current when said switching means is in said OFF state.

18. The power converter as recited in claim 15 wherein:
said first feedback control signal generating means comprises an error amplifier for detecting variations of said output load current relative to said predetermined output current reference signal.

19. The power converter as recited in claim 16 wherein:
said second feedback control signal provides a voltage representation of said current passing through said switching means for comparison with the output of said summing means.

20. The power converter as recited in claim 15 wherein:
said third feedback control signal generating means comprises a ramp generator for providing a variable ramp signal having a slope which is proportional to said power converter output voltage, said ramp signal being reset to an initial value by said clock signal.

21. The power converter as recited in claim 20 wherein:
said energy storage means comprises an inductor-capacitor filter wherein a current through said inductor has a rising slope and a falling slope, said falling slope being proportional to said power converter output voltage; and
a ratio of said slope of said ramp signal to said falling slope of said inductor current being a constant produces improved dynamic operation of said power converter.

22. A power converter for regulating output voltage comprising:
an input DC voltage ($V_I$);
switching means having ON and OFF states coupled to said DC voltage for passing said voltage in accordance with a control signal fed to said switching means;
means coupled to said switching means for sensing a current passing through said switching means when said switching means in said is ON state;
energy storage means coupled to said current sensing means for maintaining a continuous output load current from said power converter when said switching means is in said OFF state;
means for generating said control signal for said switching means in accordance with a clock signal having a predetermined frequency, a first feedback control signal, a second feedback control signal and a third feedback control signal;
means coupled to an output voltage of said power converter at the output of said energy storage means for continuous sampling of a portion of the output voltage;
means coupled to said output voltage sampling means and a predetermined output voltage reference signal for generating said first feedback control signal to maintain a constant output voltage;
said second feedback control signal being generated by said means for sensing said current passing through said switching means; and
means coupled to said output voltage sampling means for generating said third feedback control signal.

23. The power converter as recited in claim 22 wherein said control signal generating means comprises:
means for summing said first feedback control signal and said third feedback control signal;
comparator means coupled to an output signal of said summing means and an output signal of said switch current sensing means for generating a reset signal when said output signals are equal in value; and
means coupled to said reset signal and a predetermined frequency clock signal for generating said switch control signal.

24. The power converter as recited in claim 22 wherein:
said energy storage means comprises a diode coupled to a junction of said sensing means and said energy storage means for providing a path for said output load current when said switching means is in said OFF state.

25. The power converter as recited in claim 22 where in:
said first feedback control signal generating means comprises an error amplifier for detecting variations of said output voltage relative to said predetermined output voltage reference signal.

26. The power converter as recited in claim 23 wherein:
said second feedback control signal provides a voltage representation of said current passing through said switching means for comparison with the output of said summing means.

27. The power converter as recited in claim 22 wherein:
said third feedback control signal generating means comprises a ramp generator for providing a variable ramp signal having a slope which is proportional to said power converter output voltage, said ramp signal being reset to an initial value by said clock signal.

28. The power converter as recited in claim 27 wherein:
said energy storage means comprises an inductor-capacitor filter wherein a current through said inductor has a rising slope and a falling slope, said falling slope being proportional to said power converter output voltage; and
a ratio of said slope of said ramp signal to said falling slope of said inductor current being a constant produces improved dynamic operation of said power converter.

29. A method for providing a power converter having improved dynamic response comprising the steps of:
providing an input DC voltage ($V_I$);
passing said input DC voltage through a switching means having ON and OFF states in accordance with a control signal fed to said switching means;
sensing a current passing through said switching means when said switching means is in said ON state;
maintaining a continuous output load current from said power converter when said switching means is in said OFF state with energy storage means coupled to said current sensing means;
generating said control signal for said switching means in accordance with a clock signal having a predetermined frequency, a first feedback control signal, a second feedback control signal and a third feedback control signal;
sensing an output voltage of said power converter or said output load current to provide regulation of said sensed output voltage or output load current;
generating said first feedback control signal with means coupled to said output sensing means and a predetermined output reference signal;
generating said second feedback control signal by said means for sensing said current passing through said switching means;
sampling continuously said output voltage of said power converter with means coupled to said output voltage at the output of said energy storage means; and
generating said third feedback control signal with means coupled to said output voltage sampling means.

30. The method as recited in claim 29 wherein said step of maintaining an output load current comprises the step of:

providing a path for said output load current when said switching means is in said OFF state with a diode coupled to a junction of said sensing means and said energy storage means.

31. The method as recited in claim 29 wherein said step of generating said control signal comprises the steps of:

summing said first feedback control signal and said third feedback control signal;

comparing an output signal of said summing means and an output signal of said switch current sensing means to generate a reset signal when said output signals are equal in value; and generating said switch control signal with means coupled to said reset signal and a predetermined frequency clock signal.

32. The method as recited in claim 29 wherein said step of generating said first feedback control signal comprises the step of:

detecting variations of said sensed output relative to said predetermined output reference signal with an error amplifier.

33. The method as recited in claim 29 wherein said step of generating said second feedback control signal comprises the step of providing a voltage representation of said current passing through said switching means for comparison with the output of a summing means.

34. The method as recited in claim 29 wherein said step of generating said third feedback control signal comprises the step of:

providing a variable ramp signal having a slope which is proportional to said power converter output voltage, said ramp signal being reset to an initial value by said clock signal.

35. The method as recited in claim 34 wherein said step of maintaining a continuous output load current further comprises the steps of:

providing an inductor-capacitor filter in said energy storage means with a current passing through said inductor having a rising slope and a falling slope, said falling slope being proportional to said power converter output voltage; and maintaining as a constant ratio said slope of said ramp signal to said falling slope of said inductor current.

36. A method for providing a power converter having improved dynamic response comprising the steps of:

providing an input DC voltage ($V_I$);

passing said input DC voltage through a switching means having ON and OFF states in accordance with a control signal fed to said switching means;

sensing a current passing through said switching means when said switching means is in said ON state with means coupled to said switching means;

maintaining a continuous output load current from said power converter when said switching means is in said OFF state with energy storage means coupled to said current sensing means;

generating said control signal for said switching means in accordance with a clock signal having a predetermined frequency, a first feedback control signal, a second feedback control signal and a third feedback control signal;

selecting a predetermined mode of operation for said power converter with means coupled to a first feedback input representative of an output load current and a second feedback input representative of an output voltage of said power converter, a first mode of operation regulating said output load current and a second mode of operation regulating said output voltage;

sensing said continuous output load current for providing said first feedback input to said mode selecting means;

generating said first feedback control signal with means coupled to said selecting means and a predetermined reference signal;

generating said second feedback control signal by said means for sensing said current passing through said switching means;

sampling continuously said output voltage of said power converter for providing said second feedback input to said mode selecting means; and generating said third feedback control signal with means coupled to an output of said output voltage sampling means.

37. The method as recited in claim 36 wherein said step of generating said control signal comprises the steps of:

summing said first feedback control signal and said third feedback control signal;

comparing an output signal of said summing means and an output signal of said switch current sensing means to generate a reset signal when said output signals are equal in value; and generating said switch control signal with means coupled to said reset signal and a predetermined frequency clock signal.

38. The method as recited in claim 36 wherein said step of generating said first feedback control signal comprises the step of:

detecting variations of said regulated output of said selected mode of operation relative to said predetermined reference signal with an error amplifier.

39. The method as recited in claim 36 wherein said step of generating said second feedback control signal comprises the step of providing a voltage representation of said current passing through said switching means for comparison with the output of a summing means.

40. The method as recited in claim 36 wherein said step of generating said third feedback control signal comprises the step of:

providing a variable ramp signal having a slope which is proportional to said power converter output voltage, said ramp signal being reset to an initial value by said clock signal.

41. The method as recited in claim 40 wherein said step of maintaining a continuous output load current further comprises the step of:

providing an inductor-capacitor filter in said energy storage means with a current passing through said inductor having a rising slope and a falling slope, said falling slope being proportional to said power converter output voltage; and maintaining as a constant ratio said slope of said ramp signal to said falling slope of said inductor current.

42. A method for providing a power converter having improved dynamic operation when regulating a constant load current comprising the steps of:

providing an input DC voltage ($V_I$);

passing said input DC voltage through a switching means having ON and OFF states in accordance with a control signal fed to said switching means;

sensing a current passing through said switching means when said switching means is in said ON state with means coupled to said switching means;

maintaining a continuous output load current from said power converter when said switching means is in said OFF state with energy storage means coupled to said current sensing means;

generating said control signal for said switching means in accordance with a clock signal having a predetermined frequency, a first feedback control signal, a second feedback control signal and a third feedback control signal;

sensing said output load current with means coupled to an output load of said power converter;

generating said first feedback control signal to maintain a constant output load current with means coupled to said output load current sensing means and a predetermined output current reference signal;

generating said second feedback control signal by said means for sensing said current passing through said switching means;

sampling continuously a portion of an output voltage of said power converter at the output of said energy storage means; and generating said third feedback control signal with means coupled to said output voltage sampling means.

43. The method as recited in claim 42 wherein said step of generating said control signal comprises the steps of:

summing said first feedback control signal and said third feedback control signal;

comparing an output signal of said summing means and an output signal of said switch current sensing means to generate a reset signal when said output signals are equal in value; and generating said switch control signal with means coupled to said reset signal and a predetermined frequency clock signal.

44. The method as recited in claim 42 wherein said step of generating said first feedback control signal comprises the step of:

detecting variations of said output load current relative to said predetermined reference signal with an error amplifier.

45. The method as recited in claim 42 wherein said step of generating said second feedback control signal comprises the step of providing a voltage representation of said current passing through said switching means for comparison with the output of a summing means.

46. The method as recited in claim 42 wherein said step of generating said third feedback control signal comprises the step of:

providing a variable ramp signal having a slope which is proportional to said power converter output voltage, said ramp signal being reset to an initial value by said clock signal.

47. The method as recited in claim 46 wherein said step of maintaining a continuous output load current further comprises the step of:

providing an inductor-capacitor filter in said energy storage means with a current passing through said inductor having a rising slope and a falling slope, said falling slope being proportional to said power converter output voltage; and maintaining as a constant ratio said slope of said ramp signal to said falling slope of said inductor current.

48. A method for providing a power converter having improved dynamic operation when regulating an output voltage comprising the steps of:

providing an input DC voltage ($V_I$);

passing said input DC voltage through a switching means having ON and OFF states in accordance with a control signal fed to said switching means;

sensing a current passing through said switching means when said switching means is in said ON state with means coupled to said switching means;

maintaining a continuous output load current from said power converter when said switching means is in said OFF state with energy storage means coupled to said current sensing means;

generating said control signal for said switching means in accordance with a clock signal having a predetermined frequency, a first feedback control signal, a second feedback control signal and a third feedback control signal;

sampling a portion of the output voltage continuously with means coupled to said output voltage of said power converter at the output of said energy storage means;

generating said first feedback control signal to maintain a constant output voltage with means coupled to said output voltage sampling means and a predetermined output voltage reference signal;

generating said second feedback control signal by said means for sensing said current passing through said switching means; and generating said third feedback control signal with means coupled to said output voltage sampling means.

49. The method as recited in claim 48 wherein said step of generating said control signal comprises the steps of:

summing said first feedback control signal and said third feedback control signal;

comparing an output signal of said summing means and an output signal of said switch current sensing means to generate a reset signal when said output signals are equal in value; and generating said switch control signal with means coupled to said reset signal and a predetermined frequency clock signal.

50. The method as recited in claim 48 wherein said step of generating said first feedback control signal comprises the step of:

detecting variations of said output voltage relative to said predetermined reference signal with an error amplifier.

51. The method as recited in claim 48 wherein said step of generating said second feedback control signal comprises the step of providing a voltage representation of said current passing through said switching means for comparison with the output of a summing means.

52. The method as recited in claim 48 wherein said step of generating said third feedback control signal comprises the step of:

providing a variable ramp signal having a slope which is proportional to said power converter output voltage, said ramp signal being reset to an initial value by said clock signal.

53. The method as recited in claim 52 wherein said step of maintaining a continuous output load current further comprises the step of:

providing an inductor-capacitor filter in said energy storage means with a current passing through said inductor having a rising slope and a falling slope, said falling slope being proportional to said power converter output voltage; and maintaining as a constant ratio said slope of said ramp signal to said falling slope of said inductor current.

* * * * *